United States Patent
Morisada

(10) Patent No.: US 7,532,743 B2
(45) Date of Patent: May 12, 2009

(54) OBJECT DETECTOR, OBJECT DETECTING METHOD AND ROBOT

(75) Inventor: Hidehiko Morisada, Tokyo (JP)

(73) Assignee: Sony Corporation, Tokyo (JP)

( * ) Notice: Subject to any disclaimer, the term of this patent is extended or adjusted under 35 U.S.C. 154(b) by 297 days.

(21) Appl. No.: 10/916,392

(22) Filed: Aug. 12, 2004

(65) Prior Publication Data
US 2005/0069208 A1    Mar. 31, 2005

(30) Foreign Application Priority Data
Aug. 29, 2003   (JP) .............................. 2003-307924

(51) Int. Cl.
*G06K 9/00* (2006.01)
*B25J 5/00* (2006.01)
(52) U.S. Cl. ................... 382/103; 382/165; 318/568.12
(58) Field of Classification Search ................. 382/103, 382/106, 116–118, 141, 153, 155, 164, 168, 382/172, 190–195, 203, 209, 232, 260, 274, 382/276, 291–295, 305, 318, 165; 250/221; 318/568.12
See application file for complete search history.

(56) References Cited
U.S. PATENT DOCUMENTS

| | | | |
|---|---|---|---|
| 6,188,777 B1 * | 2/2001 | Darrell et al. ................ | 382/103 |
| 6,967,455 B2 * | 11/2005 | Nakadai et al. ........ | 318/568.12 |
| 7,035,456 B2 * | 4/2006 | Lestideau .................... | 382/164 |
| 7,085,402 B2 * | 8/2006 | Lee et al. .................... | 382/103 |
| 7,130,454 B1 * | 10/2006 | Berube et al. ............... | 382/118 |
| 7,180,050 B2 * | 2/2007 | Imagawa et al. ............ | 250/221 |

* cited by examiner

*Primary Examiner*—Seyed Azarian
(74) *Attorney, Agent, or Firm*—Oblon, Spivak, McClelland, Maier & Neustadt, P.C.

(57) ABSTRACT

An object detector, an object detecting method and a robot can reduce diction errors of detecting wrong objects without increasing the volume of the computational operation to be performed to detect the right object. A face detector 101 comprises a face detecting section 110 that operates like a conventional face detecting section and is adapted to roughly select face candidates from an input image by template matching and detect face candidates by means of a support vector machine for face recognition, a non-face judging section 120 that detects non-face candidates that are judged to be non-faces and removes them from the face candidates selected by the face detecting section 110 and a skin tracker section 114 for tracking a face region after the non-face judgment. When the assumed distance between the face detector and the face as computed from the input image and the measured distance as measured by a distance sensor show a large difference, when the color variance of the face candidate is small, when the occupancy ratio of the skin color region is large and when the change in the size of the face region is large after the elapse of a predetermined time, the non-face judging section 120 judges such face candidates as non-faces and removes them from the face candidates.

15 Claims, 13 Drawing Sheets

| node 100 | INPUT EVENT NAME | DATA NAME | DATA RANGE | PROBABILITY OF TRANSITION TO ANOTHER NODE | | | | | n |
|---|---|---|---|---|---|---|---|---|---|
| | | | | A | B | C | D | | |
| TRANSITION DESTINATION NODE | | | | node 120 | node 120 | node 1000 | | | node 600 |
| OUTPUT ACT | | | | ACTION 1 | ACTION 2 | MOVE BACK | | | ACTION 4 |
| 1 | BALL | SIZE | 0.1000 | 30% | | | | | |
| 2 | PAT | | | | | | | | |
| 3 | HIT | | | | | | | | |
| 4 | MOTION | | | | | | | | |
| 5 | OBSTACLE | DISTANCE | 0.100 | | 40% | 50% | | | |
| 6 | | JOY | 50.100 | | 20% | 100% | | | |
| 7 | | SURPRISE | 50.100 | | | | | | |
| 8 | | SADNESS | 50.100 | | | | | | |

OBJECT DETECTOR, OBJECT DETECTING METHOD AND ROBOT

BACKGROUND OF THE INVENTION

1. Field of the Invention

This invention relates to an object detector for detecting an object of detection such as a face or some other object, an object detecting method and a robot equipped with such an object detector. More particularly, the present invention relates to an object detector and an object detecting method that can reduce the risk of erroneously detecting other than the object of detection and also to a robot that is equipped with such an object detector.

This application claims priority of Japanese Patent Application No. 2003-307924, filed on Aug. 29, 2003, the entirety of which is incorporated by reference herein.

2. Related Background Art

A "robot" is a machine that is electrically or magnetically driven to do movements that resemble human (living body) actions. In Japan, robots became popular in the late 1960s but many of them were industrial robots including manipulators and transfer robots that were designed to realize automated and unattended production lines in factories.

Recently, efforts have been and being paid to develop utility robots that support people as partners, behaving like men, in various scenes of our daily lives in living environments. Unlike an industrial robot, a utility robot has the ability of learning how to adapt itself to various people having different personalities and various circumstances in different scenes of our daily lives in living environments. For example, "pet type" robots that resemble four-footed animals such as dogs and cats in terms of bodily mechanisms and movements and "human type" or "human-shaped" robots that are designed by using men or some other two-footed animals as model in terms of bodily mechanisms and movements are already being in the stage of practical use.

If compared with industrial robots, utility robots can act to entertain people so that they are sometimes also referred to as entertainment robots. Additionally, such robots are provided with various external sensors including CCD (charge coupled device) cameras and microphones so that they can recognize external circumstances on the basis of the outputs of the external sensors and autonomously act in response to external information and internal conditions.

It may be most desirable for an entertainment type robot if it can detect the face of the partner who is talking to the robot or that of the person who is moving and comes into the sight of the robot and talk back to the person or respond to the person by action, seeing the face of the person, because such a behavior is very natural and hence very entertaining to us.

Up until now, various proposals have been made to detect the face of a man, using only gradation patterns based on video signals, without relying on colors and motions in a moving and hence complex image.

The proposed face detection methods include a method of generating a discriminator by causing the robot to learn facial patterns in advance by means of pattern recognition techniques such as proper faces, neural networks and support vector machines (SVM).

Japanese Patent Application Laid-Open Publication No. 2002-42116

However, with the method of generating a discriminator, while the robot is highly robust relative to changes in the environment and in its own posture and countenance in the course of pattern recognition that relies on the ability developed by learning a vast volume of face image data, the volume of computational operation required for the pattern recognition is correspondingly enormous so that a long time has to be spent for the computational operation.

Actually, in a process of detecting a face image of a person out of a picked up image (to be referred to as face detection task hereinafter), the face image is discriminated as it is cut out from the picked up image. For this purpose, the picked up image is scanned in various different scales. Therefore, it is highly important to minimize the quantity of the computing operation required for discriminating a single pattern.

For example, in the case of a face detection task using pattern recognition of a support vector machine, it is necessary to computationally obtain the inner product of hundreds of support vectors (400 dimensions) relative to the vectors of 400 dimensions acquired from an image of about 400 (=20× 20) pixels cut out from the picked up image. If this operation is conducted in the entire screen having dimensions (W, H), the computational operation for obtaining the inner product have to be repeated $(W-20+1) \times (H-20+1)$ times. Then, the overall operation will amount to an enormous volume.

When a robot utilizes a face detection task, it will be very difficult to feedback the acquired data to make the robot behave on a real time basis unless a face image is detected satisfactorily quickly. The internal CPU of the robot is constantly loaded with a large number of tasks it has to perform other than the face detection task. In other words, the CPU cannot dedicate its entire computational ability to the face detection task because it also has to take care of the large number of task.

In the case of an image recognizer for recognizing an object, which may be something other than a face, from the input image, it is normally designed to recognize an object as right object when the recognized object satisfies certain conditions in terms of resemblance to and characteristics of the right object. However, when rigorous conditions are provided for the detection of the right object, the robot can miss the right object although it is there. When, on the other hand, loose conditions are provided for the detection of the right object, the robot can detect a number of wrong objects. In other words, missing the right object and detection errors are tradeoff and optimum conditions have to be provided by taking the performance of the recognizer, that of the camera that acquires input images, the volume of computational operation necessary for recognizing an object and so on into consideration.

It is not desirable to raise the volume of the computational operation that the robot has to perform because of the limited resources of the robot and detection errors will occur frequently if the image recognizer is required not to miss the right object.

SUMMARY OF THE INVENTION

In view of the above-identified circumstances of the prior art, it is therefore an object of the present invention to provide an object detector, an object detecting method and a robot that can reduce detection errors of detecting wrong objects without increasing the volume of the computational operation to be performed to detect the right object.

In an aspect of the present invention, the above object is achieved by providing an object detector for detecting an object of detection out of an input image, the detector comprising: an object detecting means adapted to detect object candidates judged to be the object; and a non-object detecting means adapted to detect non-object candidates judged to be non-objects and output the object candidates less the non-object candidates.

Thus, according to the invention, if loose conditions are provided so as to be met by an object to allow detection errors to take place to a certain extent, the non-object detecting means can eliminate detection errors by eliminating non-object candidates out of the detected object candidates. Therefore, it is possible to reduce detection errors just like a high precision recognizer with a reduced volume of computational operation.

The object of detection may be a face region and the object detecting means may be adapted to detect face candidates judged to be the face region, satisfying certain face conditions; and the non-object detecting means may be a non-face detecting means adapted to detect non-face candidates judged to be non-faces, satisfying certain non-face condition and output the face candidates less the non-face candidates. With this arrangement, it is possible to reduce detection errors in a particularly difficult face detecting operation because a non-face detecting means is arranged as non-object detecting means downstream relative to a conventional face detector.

An object detector according to the invention may further comprise a distance measuring means adapted to measure the distance between the object detector and the object of detection and the non-face detecting means is adapted to compute the assumed distance between the object detector and the object of detection on the basis of the size of the face candidate relative to the input image and judge the face candidate to be a non-face candidate when the difference between the assumed distance and the distance measured by the distance measuring means is greater than a predetermined threshold value. In other words, the object detector can judge that the detected face candidate is not a face when the detected face region is very large or very small relative to an assumable size of human face.

Additionally, the non-face detecting means may be adapted to compute the variance of the face candidate in a color space and, if the variance is less than a predetermined threshold value, judge the face candidate to be a non-face candidate. In other words, if the color variance is smaller than a certain level, the detected face candidate can be a region that shows a skin color such as an arm or a leg of a body but not a face or a wall that shows a skin color. Then, the non-face detecting means may be adapted to judge the face candidate to be a non-face candidate.

The non-face detecting means may be adapted to judge the face candidate as a non-face candidate when the difference between the size of the face candidate in the current input image and the size of the face candidate in the input image of a predetermined time ago is greater than a predetermined threshold value. Then, the non-face detecting means may judge a region whose size changes remarkably in a short period of time to be a non-face.

The non-face detecting means may be adapted to compute the occupancy ratio of the skin color region relative to the face region and judge the face candidate to be a non-face candidate when the occupancy ratio of the skin color region is higher than a predetermined threshold value. The human face includes non-skin color regions such as eyes and a mouth. If the occupancy ratio of the skin color region is too high, the non-ace detecting means may judge the face region to be a non-face candidate, which may be an arm or a leg of a body but not a face or a wall that shows a skin color.

In another aspect of the invention, there is provided an object detecting method for detecting an object of detection out of an input image, the method comprising: an object detecting step of detecting object candidates judged to be the object; and a non-object detecting step of detecting non-object candidates judged to be non-objects and outputting the object candidates less the non-object candidates.

The object of detection may be a face region and the object detecting step may be a face detecting step of detecting face candidates judged to be the face region, satisfying certain face conditions; and the non-object detecting step may be a non-face detecting step of detecting non-face candidates judged to be non-faces, satisfying certain non-face conditions and outputting the face candidates less the non-face candidates.

In still another aspect of the invention, there is provided a robot equipped with an object detector for detecting an object of detection out of an input image so as to autonomously act, the object detector comprising: an object detecting means adapted to detect object candidates judged to be the object; and a non-object detecting means adapted to detect non-object candidates judged to be non-objects and output the object candidates less the non-object candidates.

Thus, according to the invention a robot having limited resources can easily and quickly detect an object out of an input image with a minimum possibility of detection error without increasing the volume of computational operation because a detection error preventing means is arranged downstream relative to a conventional face detector.

Thus an object detector for detecting an object of detection, such as a face, out of an input image according to the invention is provided with a non-object detecting means arranged downstream relative to an object detecting means and adapted to detect non-objects candidates that are judged to be non-objects and output the object candidates detected in a preceding object detecting process less the non-object candidates so as to eliminate detection errors. When a non-face detecting means is arranged as non-object detecting means, it is possible to easily and quickly detect a face out of an input image with a minimum possibility of detection error without increasing the volume of computational operation in a particularly difficult face detecting operation. When a robot having limited resources is equipped with an object detector comprising such a non-object detecting means, it will be able to entertain people to an enhanced extent, reducing detection errors of detecting non-objects including non-faces.

BRIEF DESCRIPTION OF THE DRAWINGS

FIG. 10 is a schematic illustration of the state transition table provided in each node of the finite-probability automaton;

DETAILED DESCRIPTION OF THE PREFERRED EMBODIMENTS

Figure 1:
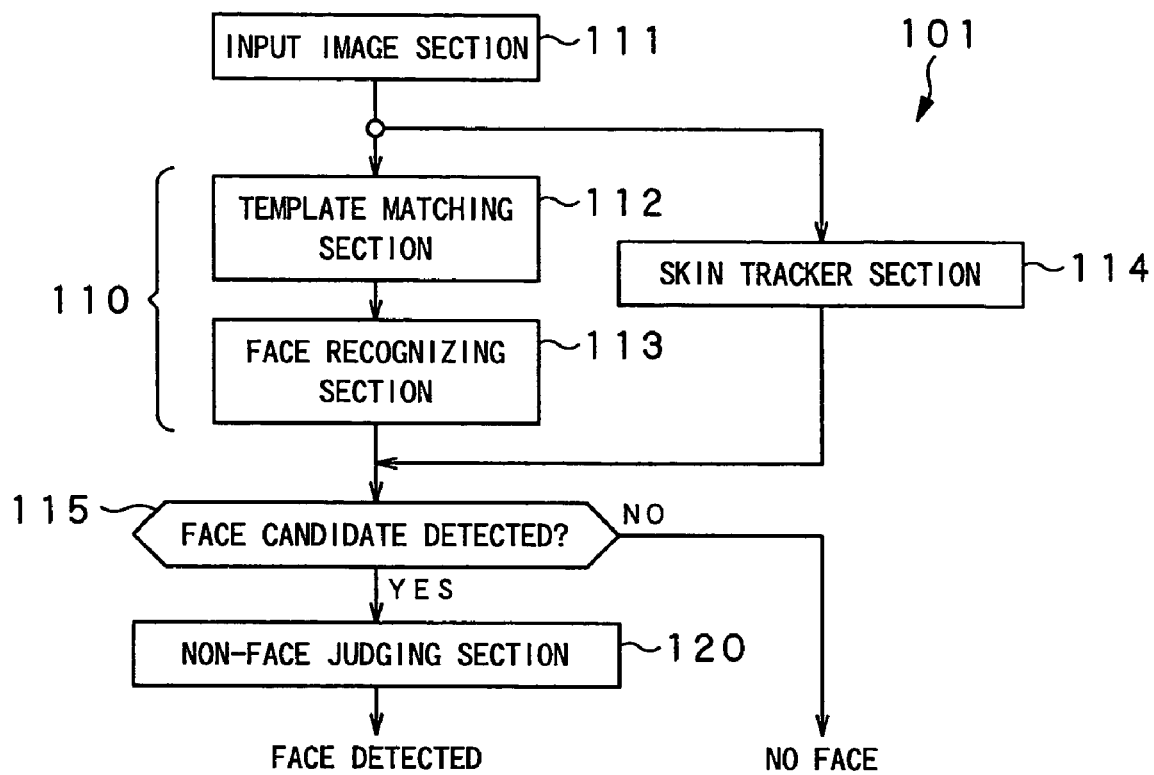
FIG. 1 is a schematic block diagram illustrating the face detecting functional units of a face detector, which is an embodiment of the present invention.

Now, the present invention will be described by referring to the accompanying drawings that illustrate preferred embodiments of the invention including an object detector adapted to reduce detection errors (recognition errors) of detecting other than the object to be detected, which is a face detector adapted to reduce detection errors of detecting wrong faces, and a robot provided with such an object detector.

An embodiment of object detector according to the invention that is a face detector will be described firstly and subsequently an embodiment of robot according to the invention and provided with such a face detector will be described. While a method of reducing detection errors of detecting wrong faces will be described below, the present invention is by no means limited to face detection and the present invention can generally find applications that need to reduce detection errors in the technical field of image recognition for detecting an object.

(1) Face Detector

Normally, a face detector is adapted to detect the face (face region) of a person out of an input image (picked up image). The face detection task has two major steps, including a first step of extracting face candidates by performing an operation of template matching on the input image and a second step of judging if each of the face candidates is the face to be detected by means of pattern recognition, typically using a support vector machine (SVM).

On the other hand, this embodiment of face detector comprises a non-face judging section adapted to detect a non-face region, thereby detecting a non-face candidate in a subsequent step (third step) out of the face candidates detected in the preceding step. Thus, detection errors are reduced by removing the non-face candidate from the face candidates.

In a system such as a robot system where resources including a CPU and memories are limited, it is necessary to reduce the volume of computational operation in the face detection task in order to detect a face on a real time basis. However, the process of face recognition typically using an SVM in the second step requires a vast amount of computational operation. Therefore, it is an effective way to reduce the number of face candidates in the first step to reduce the volume of computational operation required for face detection, while maintaining the level of face detection performance.

When extracting face candidates by template matching in the first step, a method of providing a threshold value for correlated values of matching may be used for the operation of extracting face candidates. For the purpose of reducing the number of missing face candidates, the threshold value for correlated values may be raised or the thinning operation during the template matching may be conducted less rigorously. However, if the threshold value for correlated values is lowered, the volume of computational operation will be increased remarkably to a great disadvantage to the limited resources of the robot because many face candidates will then be extracted. If, on the other hand, the threshold value is raised, the proper face can be removed from the candidates to consequently miss it, although the number of face candidates may be reduced.

In view of this problem, the inventors of the present invention have proposed a method of effectively reducing the number of face candidates to prevent the volume of computational operation from increasing without missing the proper face out of the face candidates (Japanese Patent Application No. 2003-133601). More specifically, a matching result that is a set of correlated values determined from the input image (window image) and a template of a predetermined size, indicating an average face image obtained by scanning the input image and displacing by a predetermined number of pixels, is generated and a face region is extracted on the basis of the local maximum values of the correlated values of the matching result in the first step. For the face region, the matching result is divided into a plurality of regions of a size typically same as that of the template and at least the maximum value of the correlated values is extracted as face candidate for each local region produced by the division. Then, in the second step, a face region (face image) is discriminated (determined) from the input image region that corresponds to the points extracted as face candidate typically by means of an SVM.

Meanwhile, the face recognition process entails a vast volume of computational operation as described above and hence efforts are being paid to improve the detection performance, reducing the volume of computational operation necessary for the face recognition process. However, in a device such as a robot where resources are limited, it is very difficult to improve particularly the recognition probability of the pattern recognition that is performed in the second step. Then, there can occur recognition errors where a skin color part such as an arm or a foot of a body or a wall showing a color similar to the skin color is mistaken for a face.

Thus, as a result of intensive research efforts, the inventors of the present invention came to find that, if recognition errors are permitted to a certain extent, non-face regions and hence detecting errors can be efficiently removed from the face regions (face candidates) that are judged to be faces and detected in the face detection process by providing a non-face judging section downstream relative to the face detection process and that, as a result, the face detection probability can be remarkably improved.

A major problem of the recognition technology is there are a problem that the object of detection that has to be detected can be missing (to be referred to as missing) and a problem that objects other than the object of detection can be detected (to be referred to as detection errors). The present invention is intended to reduce detection errors of detecting objects other than the object of detection that has to be detected. Missing and detection errors are tradeoff. When loose conditions are used for recognition, missing will be reduced for recognition but detection errors can be increased.

Normally, regions that are assumed to be faces are selected in the first step and a face region is extracted from those regions in the second step. In other words, the second step is provided to select a fewer number of face regions. If loose detection conditions are used for the second step, the volume of computational operation is reduced but the number of regions that are detected as face regions increases to consequently increase detection errors.

Thus, in this embodiment, in a subsequent step of the second step where the face detection is conventionally ended, a step of non-face judgment that is executed by a non-face judging section is provided as means for preventing detection errors so that detection errors may be eliminated quickly and easily.

FIG. 1 is a schematic block diagram illustrating the face detecting functional units of a face detector, which is an embodiment of the present invention. Referring to FIG. 1, face detector 101 comprises an input image section 111 for supplying input images, a face detecting section 110 that includes a template matching section 112 for extracting rough face candidates by performing an operation of template matching on the input image and a face recognizing section 113 for recognizing the rough face candidates extracted by means of a support vector machine SVM and extracting face candidates that are judged to be faces, a face detection judging section 115 for judging if face candidates are detected by the face detecting section 110 or not and a non-face judging section 120 that, when face candidates are detected by the face detecting section 110, detects non-face candidates that are judged to be not faces and outputs the face candidates from which the non-face candidates are removed.

The face detector 101 additionally comprises a skin tracker section 114 for tracking the face region obtained by the non-face judging section 120 by removing the non-face candidates from the face candidates. The face region that is the object of tracking of the skin tracker section 114 is transmitted to the non-face judging section 120 at a predetermined timing and subjected again to non-face judgment.

While the operation of the template matching section 112 and that of the face recognizing section 113 will be described hereinafter by referring to specific examples, the face detecting section 110 arranged upstream relative to the non-face judging section 120 may be adapted to use the technique of template matching and a support vector machine for face recognition or some other known face detecting method. Regardless of the type of the face detecting section 110, detection errors can be reduced by arranging a non-face judging section 120 downstream relative to the face detecting section 110.

A flag indicating a face may be used for the face region obtained by the non-face judging section 120 by removing the non-face candidates so that the skin tracker section 114 may perform a tracking operation on the face region in subsequent frames. For example, the tracking operation may be such that a skin color region is detected near the detected face region that is detected as face and subjected to tracking. The face region that is being subjected to the tracking operation of the skin tracker section 114 may be sent to the non-face judging section 120 at a predetermined timing or constantly for non-face judgment.

Now, a specific processing operation of the non-face judging section 120 will be described in detail below. The conditions to be met by a non-face judging that are imposed by the non-face judging section 120 of this embodiment may typically include the following four items.

1st condition: The assumed distance between the face detector and the actual object (face) as determined on the basis of the size of the region of the face candidate relative to the input image and the distance measured by a distance sensor show a difference greater than a predetermined value.

2nd condition: The variance of the region of the face candidate detected in the input image is not smaller than a predetermined value in a color space.

3rd condition: The change in the size of the region of the face candidate detected in the input image within a predetermined time period is not smaller than a predetermined value.

4th condition: The occupancy ratio of the skin color region in the region of the face candidate detected in the input image is not smaller than a predetermined value.

Each of the above listed conditions for non-face judgment is used to extract a non-face. In other words, if a face candidate meets one of the conditions, it is removed from the detected region (face candidate) as detection error for the purpose of eliminating detection errors. Since the volume of processing operation for such non-face judgment is by far smaller than the volume of processing operation using a support vector machine SVM described above and, if all the conditions are checked, the time required for the processing operation is very short so that the processing operation for non-face judgments can be easily performed in the environment of the robot having limited resources. Thus, the upstream face detecting section 110 is permitted to commit detection errors to a certain extent in the face detecting operation when the non-face judging section 120 is provided so that it is possible to reduce the volume of computational operation of, for example, the support vector machine SVM. It may alternatively be so arranged that a face candidate is judged to be non-face only when it satisfies more than one of the above conditions. Still alternatively, the number of conditions for non-face judgment may be increased or decreased depending on the required recognition accuracy and/or the environment and/or priority may be given to the conditions for non-face judgment.

The processing operation for the above-described non-face judgment can be described in a program code format in a manner as shown below.

```
if(     (condition1 == false) ||
        (condition2 == false) ||
        (condition3 == false) ||
        (condition4 == false) ){
            NONFACE ;
}
else{
            FACE;
}
```

Now, the above listed first through fourth conditions will be described in detail. Firstly, as for the first condition (condition1), it is determined if it is possible for the position sensing device (PSD) to measure the distance from the face detector to the person who is the object of detection or not and, if it is determined that it is possible to measure the distance, the position sensing device determines the measured distance L2. Then, the assumed distance L1 that can be assumed from the size of the face region of the face candidate detected in the input image is computed. For example, the assumed distance L1 is computed on the basis of the average value of the size of a person and the size of the face region in the input image.

Then, assumed distance L1/measured distance L2=a (to be referred to as first judgment value hereinafter) is computed. If the first judgment value a is greater than the first threshold value th0 or smaller than the second threshold value th1, the face region in the input image that is the object of judgment is determined to be false and hence not a face. If, on the other hand, the first judgment value a is not smaller than the second threshold value th1 and not greater than the first threshold value th0, the face region in the input image that is the object of judgment is determined to be true and hence a face. The face candidate (face region) that meets the first condition that the first judgment value a is greater than the first threshold value th0 or smaller than the second threshold value th1 is removed from the face candidates detected by the upstream face detecting section as non-face candidate, or as detection error.

More specifically, for example, values of the first threshold value th0=0.4 and the second threshold value th1=2.5 may be selected. Then, a face candidate that satisfies either $2.5 < a$=assumed distance $L1$/measured distance $L2$ or
$0.4 > a$=assumed distance $L1$/measured distance $L2$ is judged to be non-face.

In other words, all the face candidates other than those who satisfy the condition of $0.4 \leq a$=assumed distance $L1$/measured distance $L2 \leq 2.5$ are judged to be non-face candidates.

The non-face judging method for judging if each face candidate satisfies the first condition can be described in a program code format in a manner as shown below.

```
a = supposed_distance / measured_distance
if( is_measured_distance == true ) {
    if( (a > th0) || (th1 < a) )
        condition_1 = false;
    else
        condition_1 = true;
}
else{
    condition_1 = true;
}
``` where
is_measured_distance:=indicates if it is possible to measure the distance to the face region or not.
supposed_distance:=assumed distance L1 as computed from the size of the face region in the image.
measured_distance:=measured distance L2 as gauged by the position sensing device.

Example:
th0=2.5;
th1=0.4;

It should be noted that the threshold values th0 and th1 are appropriately selected depending on the camera used for shooting the input image, the accuracy level of the position sensing device and so on.

Now, the second condition (condition2) will be described below. The human face shows color variance to a certain extent. More specifically, all the area of the human face is not a region where the same color dominates uniformly and includes eyes and a mouth whose colors are different from the skin color. Therefore, a face region that does not show a color variance to a certain extent can be judged to be non-face. The variance in a color space can be determined from the average of the variances of the components in a frame and/or the average of a plurality of frames if the color space is a YUV (YCbCr) or RGB color space.

Figure 2:
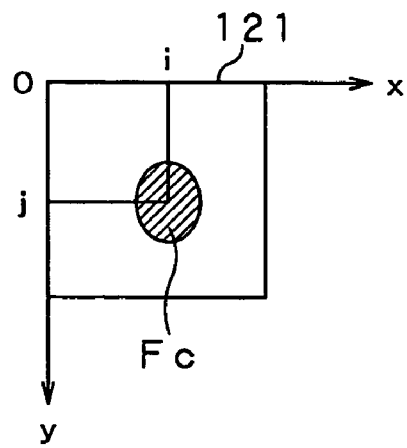
FIG. 2 is a schematic illustration of the second condition for non-face judgment of the non-face judging section of the face detector of FIG. 1, showing pixel P(i,j) in the face region that is detected as face candidate.

FIG. 2 is a schematic illustration of the second condition, showing pixel P(i,j) in the face region that is detected as face candidate. In FIG. 2, the transversal direction (extending transversally on the drawing) is X-direction and the longitudinal direction (extending longitudinally on the drawing) is Y-direction.

Referring to FIG. 2, in the input image 121, each pixel P(i,j) contained in a detected face candidate Fc is separated into an R component (Rij), a G component (Gij) and a B component (Bij). Then, the variance of the R component (Var_R), the variance of the G component Var_G) and the variance of the B component (Var_B) in the face region occupied by the face candidate Fc are computed.

Then, the face candidate is judged to be non-face if the sum/3 of the variances of the RGB components (second judgment value) is smaller than the third threshold value th2. In other words, the face candidate is judged to be non-face if the second judgment value indicating the variances is not greater than the third threshold value th2. More specifically, a value of 450 may be selected for the third threshold value th2.

In this embodiment, it may be so arranged that a face candidate is judged to be non-face if the average (first average value) of the variances of the RGB components as determined from the current frame is not greater than the third threshold value th2 and also if the average (second average value) of the variances of a plurality of consecutive frames arranged on the time axis is not greater than the fourth threshold value th3. The second average value, which is the average of the variances of a plurality of frames, can be determined by adding the first average values and divided by the number of frames.

When the second average values of a plurality of frames are used for non-face judgment, the error can be reduced and hence non-face candidates can be reliably removed if compared with the case where only the average of the variances in the current frame is used. When the average of the variances of a plurality of frames (second average value) is used along with the average of the variances in a single frame (first average value), non-faces can be detected more reliably if the third threshold value th2 that is used for the first average value is made greater than the fourth threshold value th3 that is used for the second average value so as to impose a rigorous condition for non-face judgment.

As for the non-face judgment method of seeing if the second condition is met or not, the non-face judgment method of seeing if the second condition is met in a frame can be described in a program code format in a manner as shown below.

```
if( ((Var_R + Var_G + Var_B)) / 3 < th2 ) {
    condition_2 = false;
}
else
    condition_2 = true;
}
``` where
Var_R=<variance of R component in face region>;
Var_G=<variance of G component in face region>;
Var_B=<variance of B component in face region>;
Example;
th2=450;

Now, the third condition (condition3) will be described below. The distance by which a human body can move in a predetermined period of time is limited. Therefore, a face candidate may be judged to be non-face when the ratio of the change of a face region in a predetermined period of time is greater than a predetermined value.

The third condition can be used when a face region is tracked (followed) by the skin tracker section 114. When the non-face candidates are removed by the non-face judging section 120 and a face region that is judged to be a face is detected, the skin tracker section 114 detects the skin color region thereof and tracks the face region in such a way that the center of gravity of the skin color region comes to the center of the input image and the skin color region comes into the field of view of the camera. If the face detecting section 110 processes a plurality of frames to detect a face, the third condition (condition3) may be applied to the outcome of operation of the face detecting section 110.

As a method of judging the size of the face region, it may be possible to compare the value obtained by determining the difference between the size Sf1 of the face region in the current frame that is tracked by the skin tracker section 114 and the size Sf2 of the face region in the frame of a predetermined time ago to be compared and dividing the difference by the predetermined time with the fifth threshold value th4. If the change of the face region in the predetermined time is greater than the fifth threshold value th4, the face region is judged to be non-face.

Differently stated, if the difference between the size of the face region detected, for instance, in the sixth preceding frame from the current frame and the size of the face region in the current frame is too large, the face region may be judged as non-face on an assumption that a human body does not show such an unnatural movement.

If the face detecting section 110 is adapted to detect a face candidate from a plurality of frames, it may be so arranged that the face detecting section 110 supplies the face region sizes Sf1, Sf2 to be compared with each other to the non-face judging section 120 for non-face judgment.

The non-face judgment method of seeing if the third condition is met can be described in a program code format in a manner as shown below.

```
if( (size_of_face  previous_size_of_face) / frame_interval > th3 ){
    condition_3 = false;
}
else{
    condition_3 = true;
}
``` where:
size_of_face:=the size of the current face region (in pixel)
previous_size_of_face:=the size of the face region in a previous frame (in pixel)
frame_interval:=the fame interval to be used for judgment (Ex. 6 frames)
Example:
th3=5;

Now, the fourth condition (condition4) will be described below. When the skin tracker section 114 detects a face region, it may detect the skin color region thereof and perform a tracking operation. The fourth condition can be used when the skin tracker section 114 detects a skin color region. If the face detecting section 110 detects a skin color region and recognizes a face candidate on the basis of the detected skin color region, the fourth condition may be used for non-face judgment.

As described above by referring to the second condition, the human face is not 100% skin color because it includes eyes and a mouth. Therefore, when a face region includes a skin color region by more than a predetermined ratio, it can be judged to be non-face.

More specifically, the skin color occupancy ratio Cf of the face region is determined in terms of pixels on the basis of the size of the region that is detected as face candidate by the face detecting section 110 and not judged as non-face candidate by the non-face judging section 120 and hence judged as a true face region and the size of the skin color region detected by the skin tracker section 114 that performs a tracking operation on the face region. If, for example, the skin color occupancy ratio Cf is Cf≧95%, the face region is judged to be non-face as it may be a wall showing a color close to the skin color or an arm or a foot that shows the skin color but not a face.

The above-described skin tracker section 114 is adapted to track the skin color region of the face region that is obtained when the face detecting section 110 detects face candidates and the non-face judging section 120 removes any non-face candidates from them. The non-face judging section 120 does not judge a region whose skin color occupancy ratio is smaller than 95% as non-face and the face candidate is detected as a true face region if it does not meet any of the other conditions. If such is the case and the skin tracker section 114 is adapted to track any skin color region, it may be so arranged that the non-face judging section 120 judges a face region whose skin color occupancy ratio is greater than 70% and smaller than 95% as face candidate and a face region whose skin color occupancy ratio is not greater than 70% or not smaller than 95% as non-face candidate. Alternatively, it may be so arranged that the skin tracker section 114 gauges the skin color occupancy ratio on the basis of the face region and the skin color region and tracks the skin color region only when the skin color occupancy ratio is not smaller than 70%. Still alternatively, if the face detecting section 110 is adapted to extract a skin color region and detect a face candidate on the basis of the skin color region and the fourth condition is so defined that the face region is judged as face when the skin color occupancy ratio is not smaller than 70%, it may be so arranged that a face candidate that is preliminarily judged as non-face is judged as non-face candidate when the skin color occupancy ratio is found to be not greater than 70% or not smaller than 95% after the skin tracker section 114 starts tracking the skin color region.

The non-face judgment method of seeing if the fourth condition is met can be described in a program code format in a manner as shown below.

```
if( (current_skin_rate > th4 ) ){
    condition_4 = false;
}
else{
    condition_4 = true;
}
``` where
current_flesh_rate:=the skin color occupancy ratio (%) in the pixels of the face region
Example:
th4=95;

If at least one of the above-described four conditions is met, the face region (face candidate) detected by the face detecting section 110 is judged as non-face candidate and removed from the face candidates. The four conditions require only small volume of computational operation if compared with the operation of the face detecting section. Therefore, if loose conditions are used by the face detecting section 110 to allow detection errors to take place to a certain extent, detection errors in the operation of face detection can be reduced and the volume of computational operation is not increased significantly when the non-face judging section 120 operates to judge if each face candidate meets one of the four conditions or not.

While this embodiment is so arranged that the non-face judging section 120 removes non-face candidates by judging each of the face candidates detected by the face detecting section 110 to be a face or a non-face and the skin tracker section 114 judges the region it tracks to be a face or a non-face and removes the non-face candidates in order to eliminate detection errors, the face detecting section 110 may alternatively be adapted to use a recognition method other than the method of detecting a face (face recognition) by means of template matching and/or an SVM. For example, it may be so arranged that the face detecting section 110 extracts a skin color region and then detects characteristic points such as eyes, a nose and a mouth and detects a face candidate on the basis of the characteristic quantity of each of them and their positional relationship. Still alternatively, a face detector may be realized by combining either the face detecting section 110 or the skin tracker section 114 and the non-face judging section 120.

Additionally, while non-face candidates are detected from the detected face candidates in the above-described arrangement, a similar effect can be obtained for objects of detection other than faces when a non-object judging section is provided. Particularly, when complex objects such as faces are to be detected, detection errors relating to detection of objects can be easily and quickly eliminated without increasing the volume of computational operation by arranging a non-object judging section, which corresponds to the above described non-face judging section, downstream relative to the object detecting section, which corresponds to the above described face detecting section. However, when the objects to be detected are simple objects such as balls, it may be more efficient to carry out the operation of detecting objects highly precisely than to provide a processing operation of eliminating non-objects.

(2) Robot

Now, a robot that is suited to be provided with the above-described embodiment of face detector, which comprises a non-face judging section in addition to the components of conventional face detecting section will be described below. As pointed out earlier, robots have limited resources and, as far as entertainment robots are concerned, they are required to process a vast volume of computational operation because they have to not only detect faces but also talk to the user and act according to user's instructions. Therefore, such a robot is preferably provided with a face detector that is loaded with only a relatively small volume of computational operation and accompanied by small detection errors.

(2-1) Hardware Configuration of Robot

Figure 3:
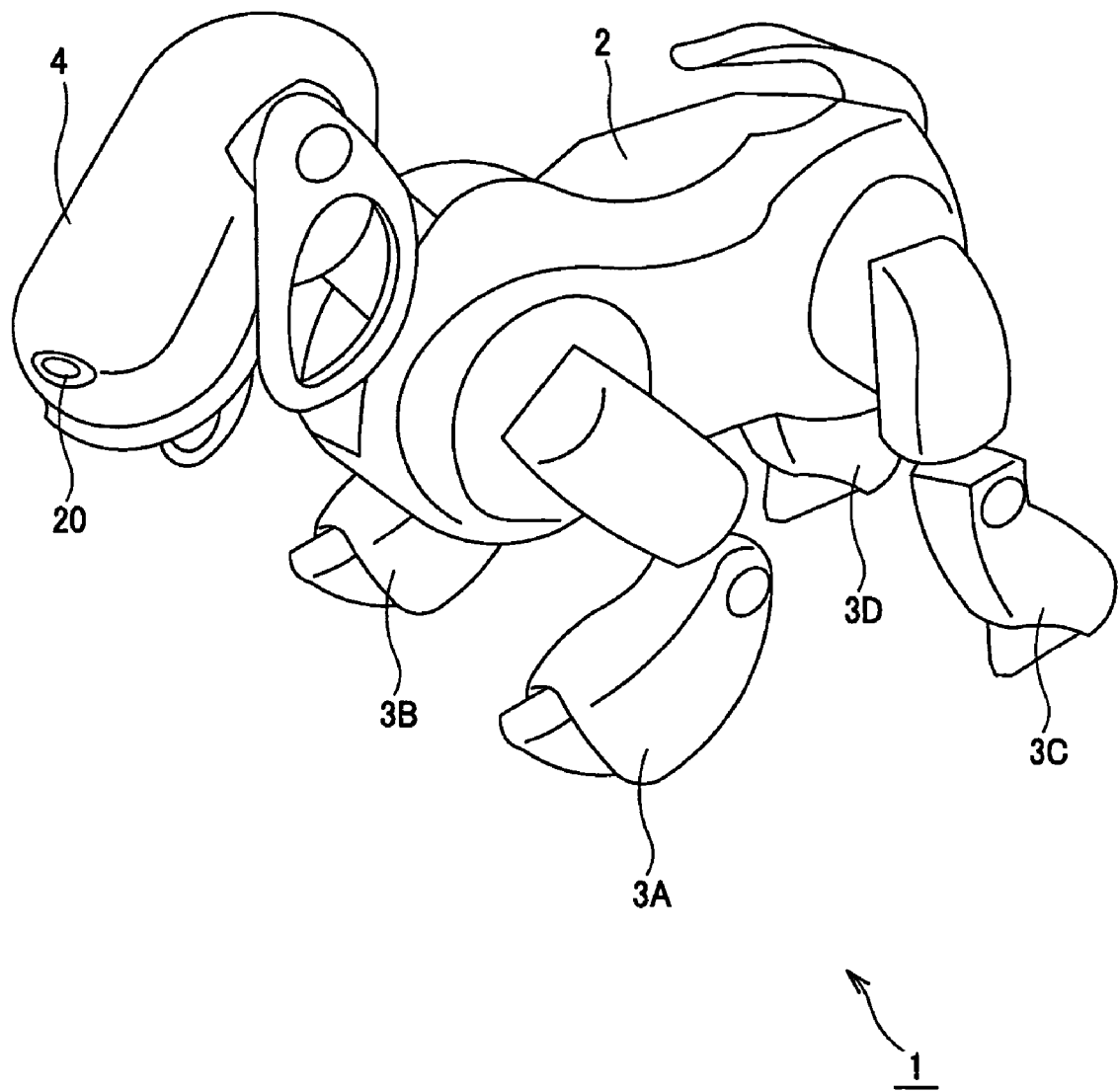
FIG. 3 is a schematic perspective view of an embodiment of robot according to the invention, showing how it appears.

As shown in FIG. 3, this embodiment of robot 1 is a four-footed and leg-moving robot and comprises a trunk unit 2 to which a pair of front leg units 3A, 3B and a pair of rear leg units 3C, 3D are linked at the left and right sides while a head unit 4 is linked at the front end thereof.

Figure 4:
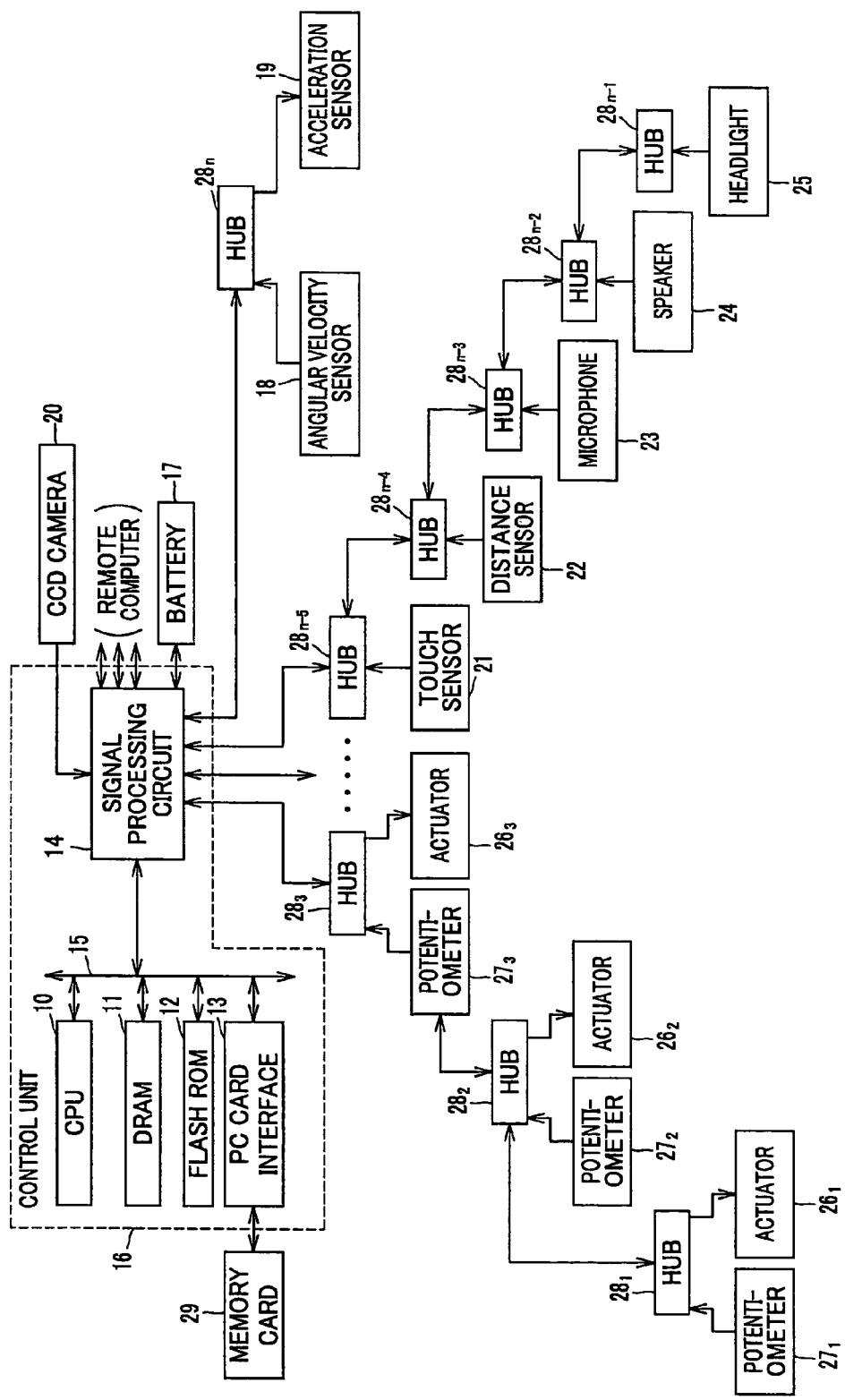
FIG. 4 is a schematic block diagram of the robot of FIG. 3, illustrating its circuit configuration.

As shown in FIG. 4, the trunk unit 2 contains therein a control section 16 formed by interconnecting a CPU (central processing unit) 10, a DRAM (dynamic random access memory) 11, a flash ROM (read only memory) 12, a PC (personal computer) card interface circuit 13 and a signal processing circuit 14 by way of an internal bus 15 and a battery 17 that operates as power source of the robot 1. The trunk unit 2 additionally contains an angular velocity sensor 18 and an acceleration sensor 19 for detecting the direction and the acceleration of movement of the robot 1.

In the head unit 4, a CCD (Charge Coupled Device) camera 20 for shooting external scenes and detecting the brightness of the surroundings, a touch sensor 21 for detecting physical actions applied by the user such as an action trying to push down the robot forwardly and backwardly, a distance sensor 22 for gauging the distance from the robot to an object located in front of it, a microphone 23 for collecting external sounds, a speaker 24 for outputting various sounds, a headlight 25 that is stored in the head unit 4 and LEDs (light emitting diodes) (not shown) that operate as "eyes" of the robot 1 are arranged. In addition to the touch sensor 21, the robot 1 is equipped with a plurality of touch sensors that are arranged at respective predetermined positions of the trunk unit 2 and the head unit 4.

The joints of the leg units 3A through 3D and the link members linking the leg units 3A through 3D and the trunk unit 2 and the link member linking the head unit 4 and the trunk unit 2 are provided with actuators $26_1$ through $26_n$ and potentiometers $27_1$ through $27_n$, the number of actuators and that of potentiometers at each of the joints and the link members being defined by its degree of freedom. The leg units 3A through 3D are driven and controlled by servo motors so that the robot 1 may take a target posture or action.

The angular velocity sensor 18, the acceleration sensor 19, the touch sensor 21, the distance sensor 22, the microphone 23, the speaker 24 and the sensors including the potentiometers $27_1$ through $27_n$, the headlight 25, the LEDs and the actuators $26_1$ through $26_n$ are connected to the signal processing circuit 14 of the control section 16 by way of corresponding hubs $28_1$ through $28_n$, while the CCD camera 20 and the battery 17 are directly connected to the signal processing circuit 14.

The signal processing circuit 14 takes in the sensor data, the image data and the sound data supplied from the respective sensors and sequentially stores them in predetermined respective positions in the DRAM 11 by way of the internal bus 15. The signal processing circuit 14 also sequentially takes in the battery residual data that are the data on the remaining power of the battery supplied from the battery 17 and stores them in predetermined respective positions in the DRAM 11.

Thus, the sensor data, the image data, the sound data and the battery residual data stored in the DRAM 11 are utilized by the CPU 10 to control the action of the robot 1.

In actuality, as power is supplied to the robot 1, the CPU 10 reads the control program stored in the memory card 29 loaded in the PC card slot (not shown) of the trunk unit 2 or in the flash ROM 12 directly or by way of the PC card interface circuit 13 and stores it in the DRAM 11.

The CPU 10 also judges the situation of the robot and the surroundings as well as if there is an instruction and/or an action given by the user or not on the basis of the sensor data, the image data, the sound data and the battery residual data that are sequentially stored in the DRAM 11 by the signal processing circuit 14 as described above.

When this embodiment carries out a face detection task, the CCD detects a face candidate out of the input image that is picked up by the CCD and detects a non-face candidate, if any, typically using the distance detected by the distance sensor and applying the above described four conditions. Then, it outputs a face region obtained by removing the non-face candidate from the face candidate.

Additionally, the CPU 10 determines a plan for the subsequent action to be taken on the basis of the result of judgment and the control program stored in the DRAM 11 and has the head unit 4 swing itself up and down and/or sideways and/or the leg units 3A through 3D move and walk by driving the related actuators $26_1$ through $26_n$ according to the determined plan.

At this time, if necessary, the CPU 10 also prepares sound data and applies them to the speaker 24 as sound signal by way of the signal processing circuit 14 so as to have the speaker 24 output sounds according to the sound signal, while it have any of the LEDs emit light, stop emitting light or flash themselves. Additionally, the CPU 10 have the CCD camera 20 detect the brightness of the surroundings and turn on the headlight 25 depending on the result of the detection.

In this way, the robot 1 can autonomously behave in response to the situation of itself and the surroundings as well as to the instruction and/or the action given by the user.

(2-2) Software Configuration of Control Program

Figure 5:
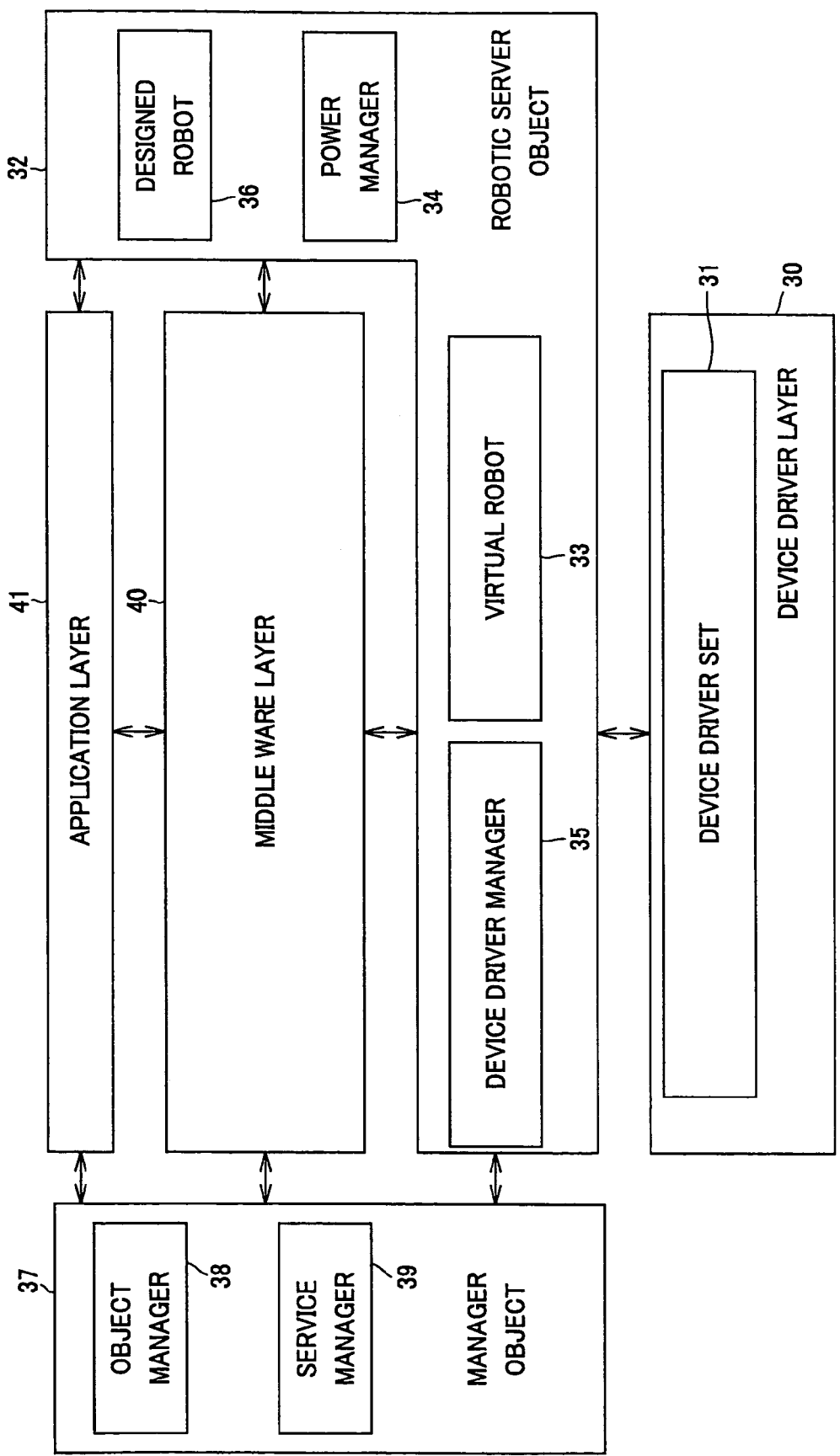
FIG. 5 is a schematic block diagram of the robot of FIG. 3, illustrating its software configuration.

FIG. 5 is a schematic block diagram of the above-described software configuration of the robot 1. Referring to FIG. 5, device driver layer 30 is located at the lowermost layer of the control program and comprises a device driver set 31 formed by a plurality of device drivers. Each of the device drivers is an object that is permitted to access pieces of hardware such as the CCD camera 20 (FIG. 4) and the timer that is normally included in an ordinary computer and adapted to perform a processing operation in response to an interrupt of any corresponding piece of hardware.

Robotic server object 32 is located at the lowermost layer of the device driver layer 30 and comprises a virtual robot 33 that includes a group of pieces of software adapted to provide an interface for accessing the pieces of hardware such as the above-described actuators $26_1$ through $26_n$ of the above-listed various sensors, a power manager 34 that includes a group of pieces of software adapted to manage power supply switching operations, a device driver manager 35 that includes a group of pieces of software adapted to manage other various device drivers and a design robot 36 that includes a group of pieces of software adapted to manage the mechanism of the robot 1.

The manager object 37 includes an object manager 38 and a service manager 39. The object manager 38 is a group of pieces of software for managing the start and the end of operation of each of the group of pieces of software contained in the robotic server object 32, the middle ware layer 40 and the application layer 41, while the service manager 39 is a group of pieces of software for managing the connection of each object according to the inter-object connection information described in the connection file stored in the memory card 29 (FIG. 4).

The middle ware layer 40 is located above the robotic server object 32 and formed by a group of pieces of software for providing the robot 1 with basic functions including image processing and sound processing. The application layer 41 is located above the middle ware layer 40 and formed by a group of pieces of software for determining the action of the robot 1 according to the result of the processing operations performed by the group of pieces of software of the middle ware layer 40.

Figure 6:
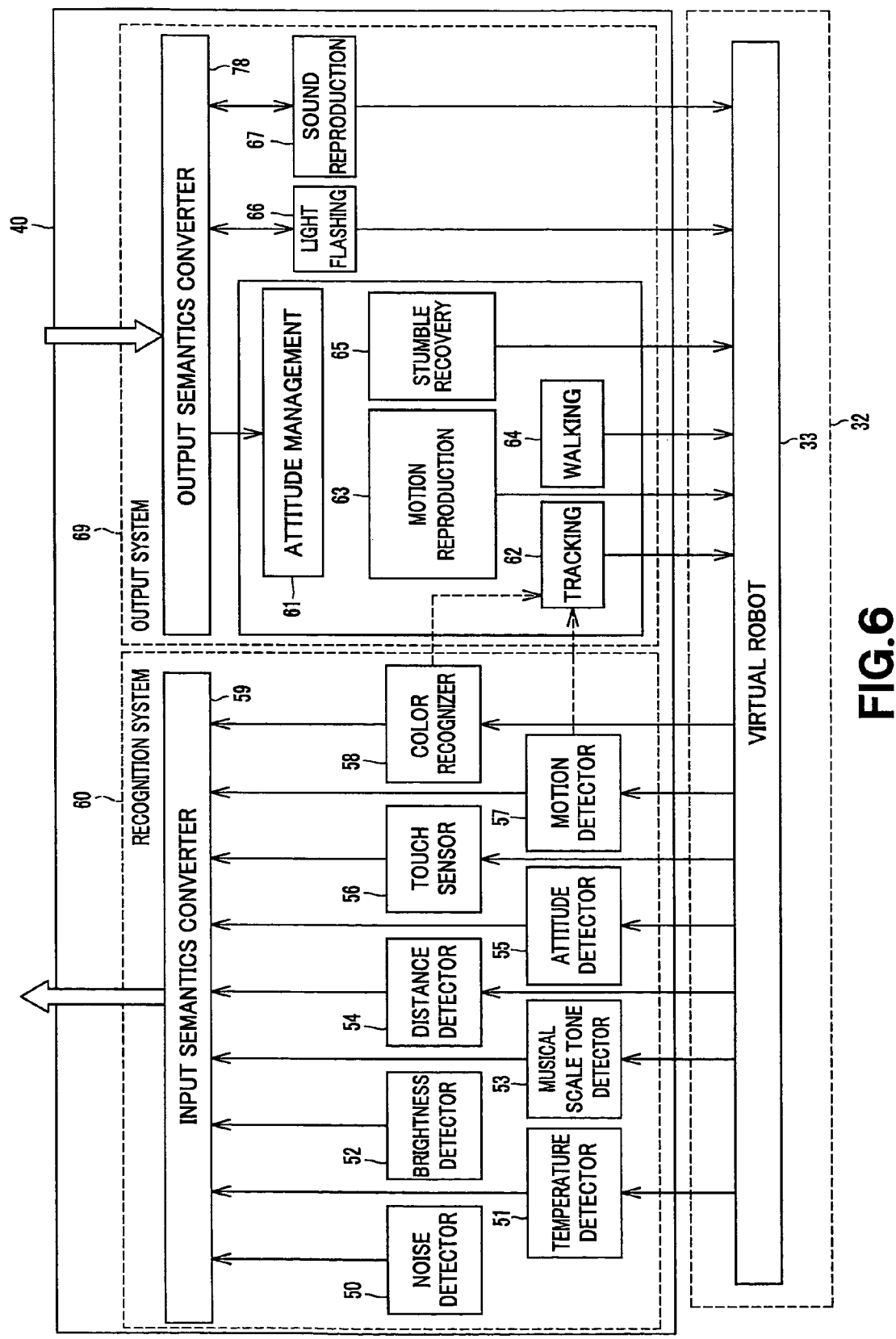
FIG. 6 is a schematic block diagram of the middle ware layer of the software configuration of the robot of FIG. 5.
Figure 7:
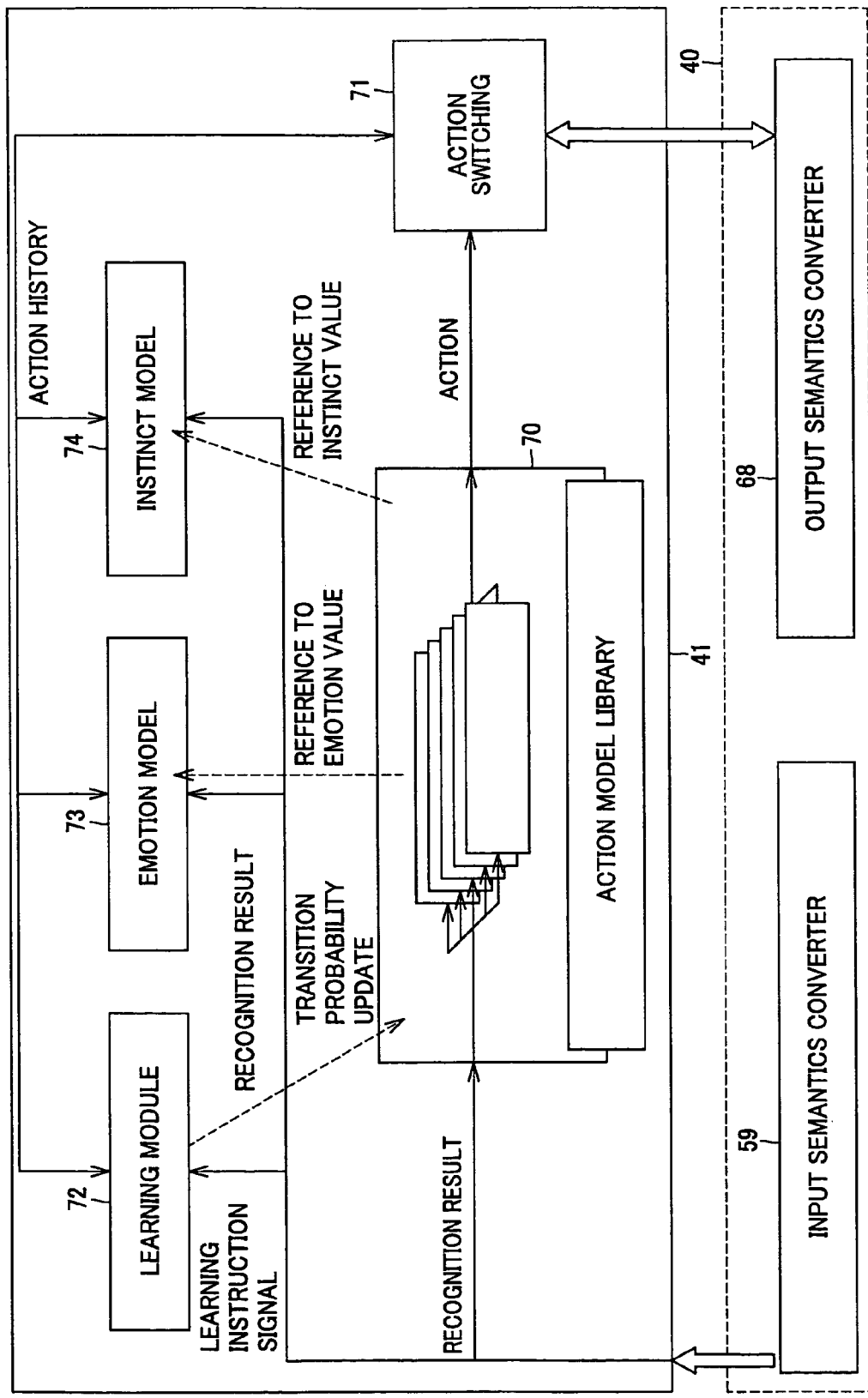
FIG. 7 is a schematic block diagram of the application layer of the software configuration of the robot of FIG. 5.

FIG. 6 is a schematic block diagram showing the configuration of the middle ware layer 40 in the software configuration of the robot of FIG. 5. FIG. 7 is a schematic block diagram showing the configuration of the application layer 41 in the software configuration of the robot of FIG. 5.

Referring to FIG. 6, the middle ware layer 40 has a recognition system 60 that includes signal processing modules 50 through 58 for detecting noises, temperature and brightness, recognizing tones of the music scale, detecting distances and attitudes, sensing touches, detecting motions and recognizing colors and an input semantics converter module 59 and an output system 69 that includes an output semantics converter module 68 and signal processing modules 61 through 67 for attitude management, tracking, motion reproduction, walking, rising up from a tumbled down state, lighting and sound reproduction.

Each of the signal processing modules 50 through 58 of the recognition system 60 is adapted to take in the corresponding ones of the sensor data, the image data and the sound data read out from the DRAM 11 (FIG. 4) by the virtual robot 33 of the robotic server object 32, perform predetermined processing operations according to the data and supply the results of the processing operations to the input semantics converter module 59. The virtual robot 33 is designed to take a role of exchanging or converting signals according to predetermined communication protocols.

The input semantics converter module 59 is adapted to recognize the situation of itself and the surroundings and the instruction or the action given by the user such as "noisy", "hot", "light", "a ball is detected", "a tumble is detected", "stroked", "hit", "tones of do, mi and so are heard", "a moving body is detected, "an obstacle is detected" and so on and output the result of recognition to the application layer 41 (FIG. 4).

Referring to FIG. 7, the application layer 41 has five modules including an action model library 70, an action switch module 71, a learning module 72, an emotion model 73 and an instinct model 74.

Figure 8:
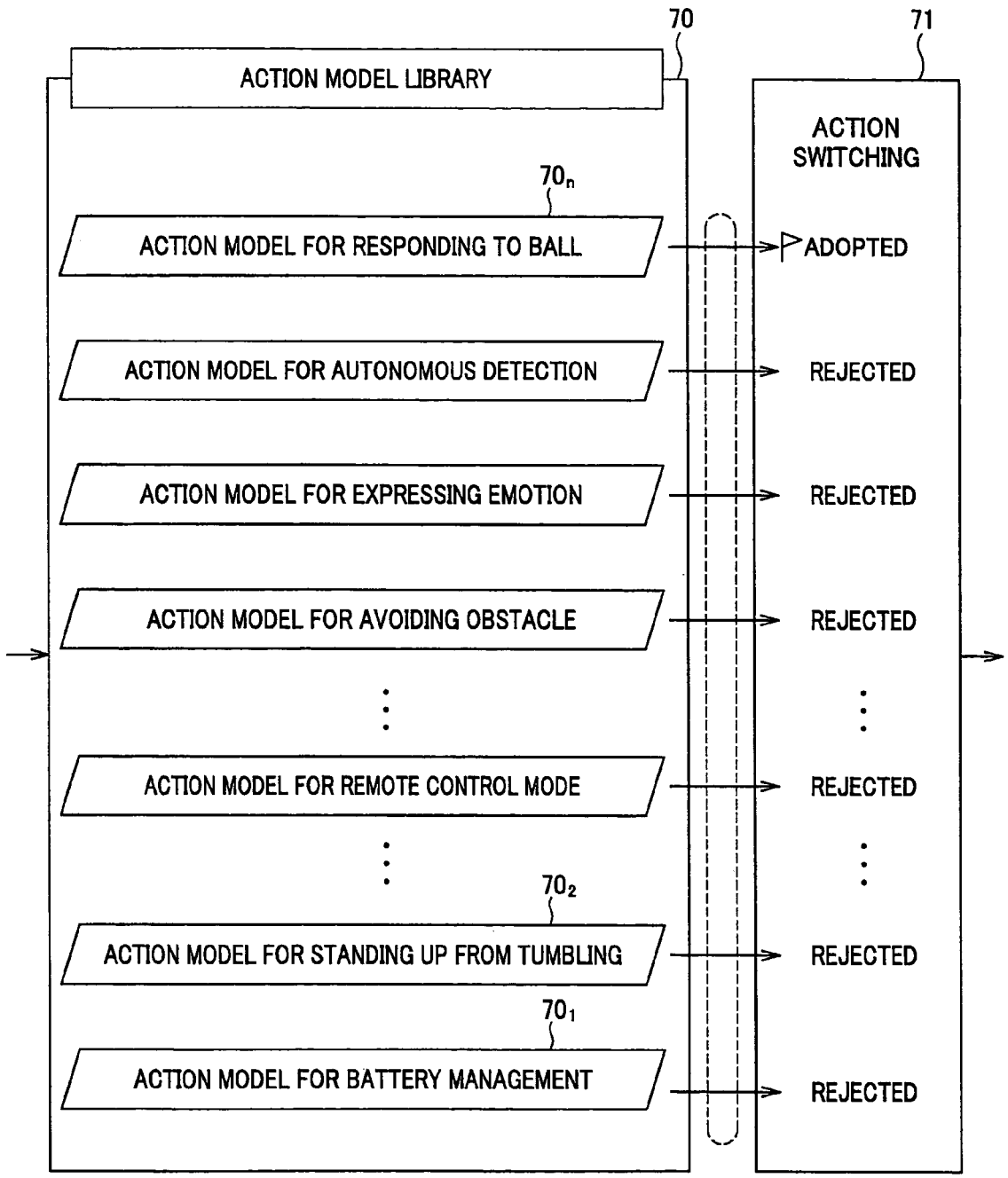
FIG. 8 is a schematic block diagram of the behavior model library of the application layer of FIG. 7, illustrating its configuration.

Referring to FIG. 8, the action model library 70 contains independent action models $70_1$ through $70_n$ that corresponds to so many pre-selected items of conditions, or occasions, such as "an occasion where the battery residual is reduced", "an occasion of standing up from a tumbled state", "an occasion of avoiding an obstacle", "an occasion of expressing a feeling", "an occasion of detecting a ball" and so on.

When the result of recognition is given by the input semantics converter module 59 or when a predetermined time has elapsed since the last result of recognition is given, the action models $70_1$ through $70_n$ determine the subsequent action by referring to the parameter value of the corresponding affect held in the emotion model 73 or the parameter value of the corresponding desire held in the instinct model 74 and output the result of determination to the action switch module 71.

Figure 9:
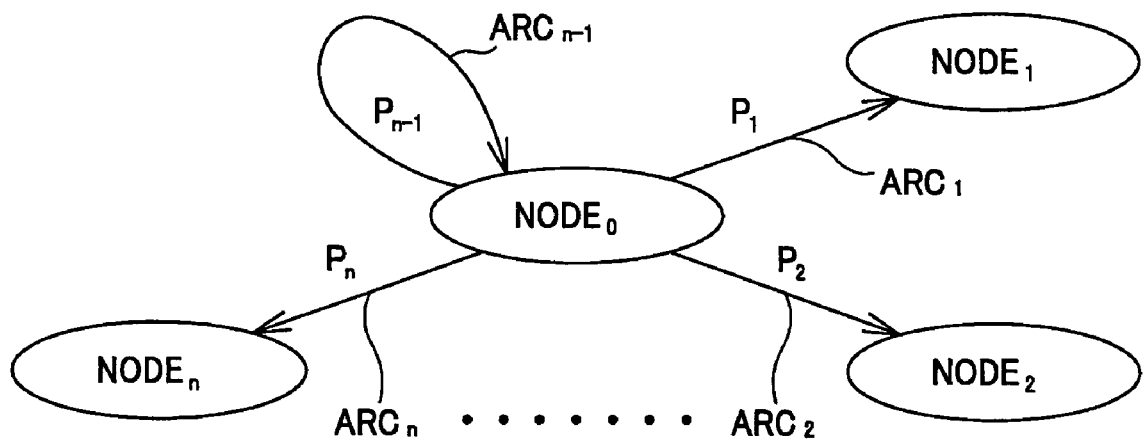
FIG. 9 is a schematic illustration of a finite-probability automaton that provides information for defining the behavior of the robot.

In the case of this embodiment, the action models $70_1$ through $70_n$ use an algorithm that is referred to as finite probability automaton and determine transition from one of the nodes (state) $NODE_0$ through $NODE_n$ to some other one of the nodes $NODE_0$ through $NODE_n$ on the basis of probability and according to the transition probabilities $P_1$ through $P_n$ defined for the arcs $ARC_1$ through $ARC_n$ connecting the $NODE_0$ through $NODE_n$ as shown in FIG. 9.

More specifically, the action models $70_1$ through $70_n$ have a state transition table 80 as shown in FIG. 10 for each of the nodes $NODE_0$ through $NODE_n$ so that the action models $70_1$ through $70_n$ may be formed by using the nodes $NODE_0$ through $NODE_n$.

In each of the state transition table 80, input events (results of recognition) that provide conditions for transition of the corresponding one of the nodes $NODE_0$ through $NODE_n$ are listed with priority in the columns of "input event name" and further conditions accompanying each of the conditions for transition are listed in the corresponding rows under the columns of "data name" and "data range".

Thus, in the case of $NODE_{100}$ shown in the transition table 80 of FIG. 10, when the result of recognition of "a ball is detected (BALL)" is given, the conditions for transition to some other node that are given with the result of recognition include that the "size (SIZE)" of the ball is within a range between "0 and 1,000". Similarly, when the result of recognition of "an obstacle is detected (OBSTACLE)" is given, the conditions for transition to some other node that are given with the result of recognition include that the "distance (DISTANCE)" to the obstacle is within a range between "0 and 100".

Additionally, the $NODE_{100}$ is adapted to transition to some other node when no result of recognition is input to it but of the parameter values of affects and those of desires held respectively in the emotion model 73 and the instinct model 74 that the action models $70_1$ through $70_n$ refer to periodically, when the parameter value of "joy (JOY)", "surprise (SURPRISE)" or "sadness (SADNESS)" held in the emotion model 73 is found within a range between "50 and 100".

In the state transition table 80, the names of the nodes to which transition is allowed from the nodes $NODE_0$ through $NODE_n$ are listed in the column of "transition probability to another node" and in the row of "transition destination node" and the probabilities of transition to selected ones of the nodes $NODE_0$ through $NODE_n$ that are applicable when all the conditions listed in the columns of "input event name", "data value" and "data range" are satisfied are listed respectively in the corresponding windows, while the actions to be output at the time of transition to the corresponding ones of the $NODE_0$ through NODE, are listed in the column of "transition probability to another node" and in the row of "output action". The sum of the probabilities of each row in the column of "transition probability to another node" is 100[%].

Thus, in the case of node $NODE_{100}$ shown in the state transition table 80 of FIG. 10, when the result of recognition that "a ball is detected (BALL)" and the "size (SIZE)" is within the range between "0 and 1,000" is given, transition to "node $NODE_{120}$ (node 120)" takes place with a probability of "30[%]" and then the action of "ACTION1" is output.

Each of the action models $70_1$ through $70_n$ is designed in such a way that many of the nodes $NODE_0$ through NODE that are described in the respective state transition tables 80 can be linked. Thus, when the result of recognition is given from the input semantics converter module 59, the next action is determined by using the state transition table of the corresponding one of the nodes $NODE_0$ through $NODE_n$ and the result of determination is output to the action switch module 71.

The action switch module 71 selects the action that is output from one of the high priority action models $70_1$ through $70_n$ out of the actions output from the action models $70_1$ through $70_n$ of the action model library 70 and transmits a command for realizing the action (to be referred to as action command hereinafter) to the output semantics converter module 68 of the middle ware layer 40. In this embodiment, action models $70_1$ through $70_n$ that are arranged in lower rows in FIG. 8 have higher priority.

When the action is completed according to the information telling that the action is completed as provided by the output semantics converter module 68 after the completion of the action, the action switch module 71 notifies the learning module 72, the emotion model 73 and the instinct model 74 of the fact that that the action is completed.

On the other hand, the learning module 72 inputs the result of recognition of an action given by the user such as "hit" or "stroked" out of the results of recognition given from the input semantics converter module 59.

Then, the learning module 72 is adapted to change the transition probability of any of the action models $70_1$ through $70_n$ in the action model library 70 in such a way that it lowers the probability of taking an action when the robot is "hit (scolded)" as a result of such an action according to the result of recognition and the notification from the action switch module 71 and raises the probability of taking an action when the robot is "stroked (praised)" as a result of such an action.

On the other hand, the emotion model 73 holds parameters for expressing the intensity of each of six affects including "joy", "sadness", "anger", "surprise", "disgust" and "fear". The emotion model 73 is adapted to periodically update each of the parameter values of these affects according to the specific result of recognition such as "hit" or "stroked" given from the input semantics converter module 59, the elapsed time and the notification given from the action switch module 71.

More specifically, the emotion model 73 computes the parameter value E[t+1] of an affect in the next cycle period, using formula (1) below, where ΔE[t] is the quantity of change in the affect which is calculated according to the result of recognition given from the input semantics converter module 59, an action of the robot 1 at that time and the elapsed time from the previous update, using a predetermined computational operation, and E[t] is the current parameter value of the affect, and updates the parameter value of the affect by replacing the current parameter value E[t] by the parameter value E[t+1] of the next cycle period. The emotion model 73 updates the parameter values of all the affects in a similar manner.

$$E[t+1]=E[t]+k e \times \Delta E[t] \quad (1)$$

The extent of influence of each result of recognition and the notification from the output semantics converter module 68 on the quantity of change ΔE[t] in the parameter value of each affect is predefined. For instance, the result of recognition of being "hit" influences greatly to the quantity of change ΔE[t] in the parameter value of the affect of "anger", while the result of recognition of being "stroked" influences greatly to the quantity of change ΔE[t] in the parameter value of the affect of "joy".

The notification from the output semantics converter module 68 is so-called feedback information (information on completion of an action) and information on the result of occurrence of an action. The emotion model 73 changes the emotion of the robot 1 according to such information. For example, it may be so arranged that an action of "crying" lowers the level of emotion of anger. The notification from the output semantics converter module 68 is also input to the learning module 72. The learning module 72 modifies the transition probability of the corresponding one of the action models $70_1$ through $70_n$ according to the notification.

The feedback of the result of action may be realized by the output (action accompanied by emotion) of the action switch module 71.

On the other hand, the instinct model 74 holds parameters for expressing the intensity of each of four independent desires including "desire for exercise", "desire for affection", "appetite" and "curiosity". The instinct model 74 is adapted to periodically update each of the parameter values of these desires according to the specific result of recognition given from the input semantics converter module 59, the elapsed time and the notification given from the action switch module 71.

More specifically, the instinct model 74 computes the parameter value I[k+1] of a desire in the next cycle period, using formula (2) below, where ΔI[k] is the quantity of change in the desire which is calculated according to the result of recognition, the elapsed time and the notification given from the output semantics converter module 68 for "desire for exercise", "desire for affection" and "curiosity", using a predetermined computational operation, I[k] is the current parameter value of the desire and ki is a coefficient showing sensitivity of the desire, and updates the parameter value of the desire by replacing the current parameter value I[k] by the parameter value I[k+1] of the next cycle period. The instinct model 74 updates the parameter values of all the desire except "appetite" in a similar manner.

$$I[k+1]=I[k]+ki\times \Delta I[k] \quad (2)$$

The extent of influence of each result of recognition and the notification from the output semantics converter module 68 on the quantity of change ΔI[k] in the parameter value of each desire is predefined. For instance, the result of recognition of being "tired" influences greatly to the quantity of change ΔI[k] in the parameter value.

In this embodiment, the parameter value of each affect and each desire (instinct) is so restricted that it changes within a range between 0 and 100 and the value of each of the coefficients ke are defined for the corresponding respective affect, while the value of each of the coefficients ki are also defined for the corresponding desire.

On the other hand, the output semantics converter module 68 of the middle ware layer 40 is adapted to apply abstractive action commands such as "proceed", "be pleased", "cry" and "track (chase the ball)" that are given from the action switch module 71 of the application layer 41 in a manner as described above to the corresponding signal processing modules 61 through 67 of the output system 69 shown in FIG. 6.

When an action command is given, the signal processing modules 61 through 67 generate the servo command value to be given to the corresponding one(s) of the actuators $26_1$ through $26_n$, the sound data of the sound to be output from the speaker 24 (FIG. 4) or the drive data to be given to the LEDs that operate as "eyes" and transmit the data to the corresponding one(s) of the actuators $26_1$ through $26_n$, the speaker 24 or the LEDs, whichever appropriate, by way of the virtual robot 33 of the robotic server object 32 and the signal processing circuit 14 (FIG. 4) in the mentioned order.

In this way, the robot 1 can autonomously behave in response to the situation of itself (internal) and the surroundings (external) as well as to the instruction and/or the action given by the user. With this robot which can autonomously behave and equipped with the above face detector which realizes to reduce detection errors, it is possible to perform accurate face detection on a real time basis and realize smooth communications with a user.

(3) Specific Example of Face Detecting Section

Now, a specific example of the face detecting section 110 that is arranged upstream relative to the non-face judging section 120 of the face detector of this embodiment and adapted to extract face candidates will be described below. The face detecting section operates for template matching on the input image picked up by the robot and roughly extracts face candidates for the purpose of face detecting operation of confirming if each face candidate is really a face or not, while reducing the volume of computational operation of the downstream SVM and other units so as to make the robot operate for face detection on a real time basis (see Japanese Patent Application No. 2003-133601).

As described above, with the method of extracting face candidates by operating for template matching (1st Step) and judging if each of the face candidates is the face to be detected, using an SVM (2nd Step), when the risk of missing face candidates in the operation of determining face candidates is to be reduced simply at the cost of normalized correlated values in the first step, either the technique of raising the threshold value or that of reducing the extent of thinning may be employed. If the threshold value is lowered, the volume of computational operation is increased to a great disadvantage of the robot with limited resources. If, on the other hand, the threshold value is raised, while the number of candidate images to be judged for face in the second step is reduced to by turn reduce the volume of computational operation, the image of the proper face may be removed from the candidate images and consequently miss the image of the face.

The inventors of the present invention paid attention to the fact that, when a face region (face image) whose size is same as that of the template exists in the image and the correlation of the face image and the template is used, the correlated value is maximized at or near the template size. Then, the inventors of the present invention came to find a method of reducing the volume of computation operation necessary for judging each of the face candidates in the second step without missing the image of the proper face, using an algorithm for reducing the number of images of face candidates in an operation of locally reducing the number of images of face candidates. More specifically, face regions of face candidates are extracted on the basis of the local maximum value out of the correlated values in the result of matching that provides a set of correlated values for the normalized correlation of the input image and the template of an average face of a predetermined size. Now, the face detection method will be described in detail below.

The face detector of this embodiment is advantageous when it is used in a system such as a robot 1 having only limited resources including a CPU and memories that mimics an animal for the purpose of reducing the volume of computational operation necessary for detecting a face, while maintaining the performance of the face detector.

(3-1) Processing Operation of Signal Processing Circuit 14 Relating to the Feature of Face Detection Task Now the feature of face detection task with which the robot 1 of this embodiment is equipped will be described. As pointed out above, the robot 1 is equipped with the functional feature of face detection task of detecting an image of a human face out of the image of each frame that is stored in the internal memory (DRAM) 11 by way of the CCD camera 20. The functional feature of face detection task is realized by way of various processing operations of the signal protocol circuit 14 that operates as principal control section.

Figure 11:
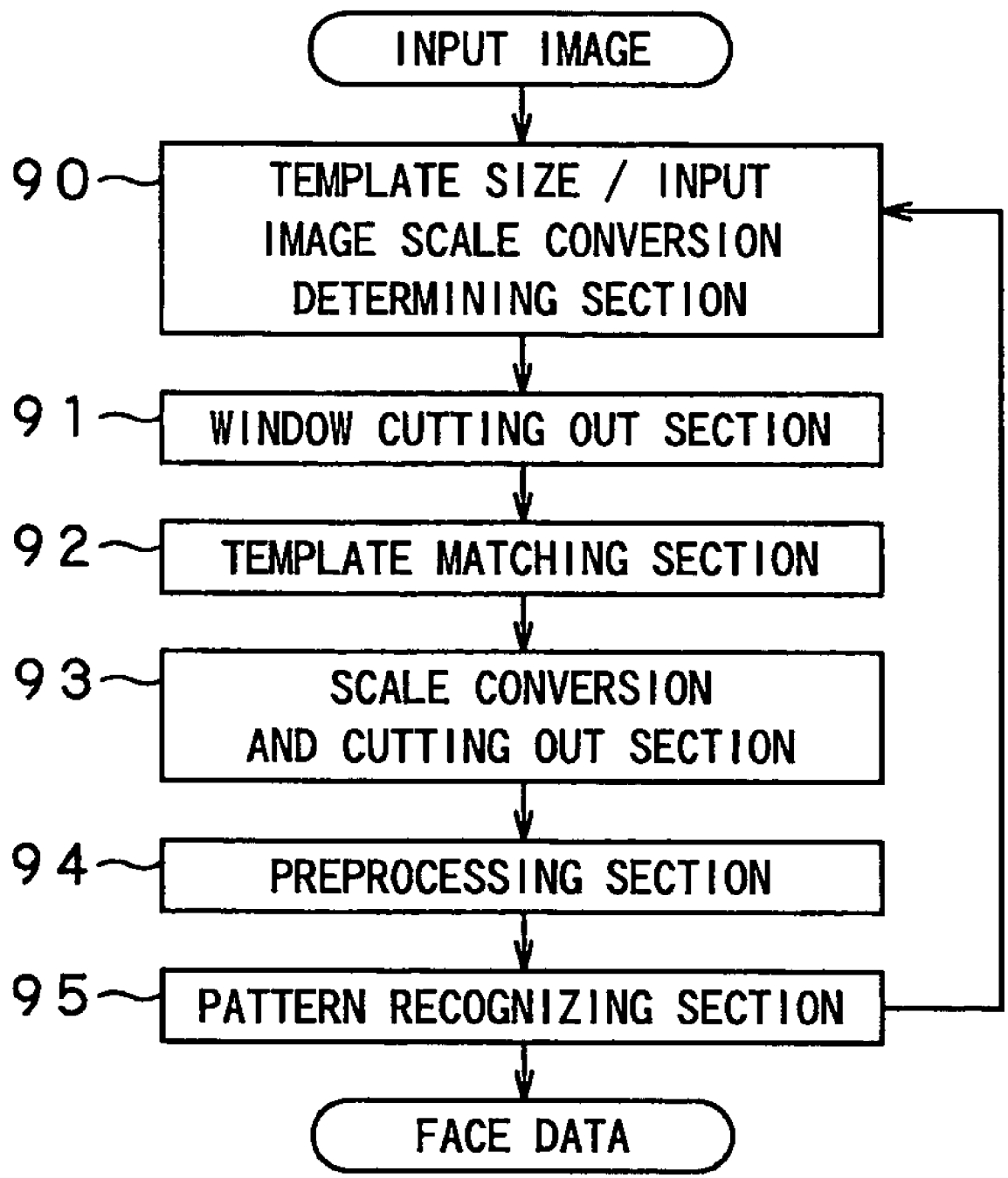
FIG. 11 is a schematic block diagram of the face detecting functional units of the robot of FIG. 3 except the non-face detecting section.

From the functional point of view, the signal processing circuit 14 can be divided into a template size and input image scale conversion determining section 90, a window cutting out section 91, a template matching section 92, a scale conversion and cutting out section 93, a preprocessing section 94 and a pattern discriminating section 95 as shown in FIG. 11 in terms of the functional feature of face detection task.

The input image scale conversion determining section 90 reads out a frame image from the internal memory (DRAM) 11 of the robot according to the video signal from the CCD camera 20 as shown in FIG. 4 and converts it into a plurality of scale images (first through fifth scale images) of different contraction ratios and selects the template size to be used at the downstream template matching section 92, or the size of the face image (to be referred to as first template size hereinafter).

The immediately downstream window cutting out section 91 scans the first scale image out of the first through fifth scale images from the upper left corner of the image to the lower right corner, skipping appropriate number of pixels (e.g. two pixels), to cut out a window image of 400 (=20×20) pixels having a rectangular region. In this way, it sequentially cuts out a number of window images from the first scale image.

At this time, the window cutting out section 91 transmits the leading window image of the plurality of window images it has cut out from the first scale image to the downstream template matching section 92 along with the template of the first template size selected by the scale conversion determining section 90.

The template matching section 92 operates for rough matching on the leading window image obtained from the window cutting out section 91, using an average face image having the first template size as template and stores the set of correlated values showing a correlation with the template (the ratio of the number of the matching pixels of the template) in the DRAM 11 as the result of the matching operation along with the window image.

Figure 12A:
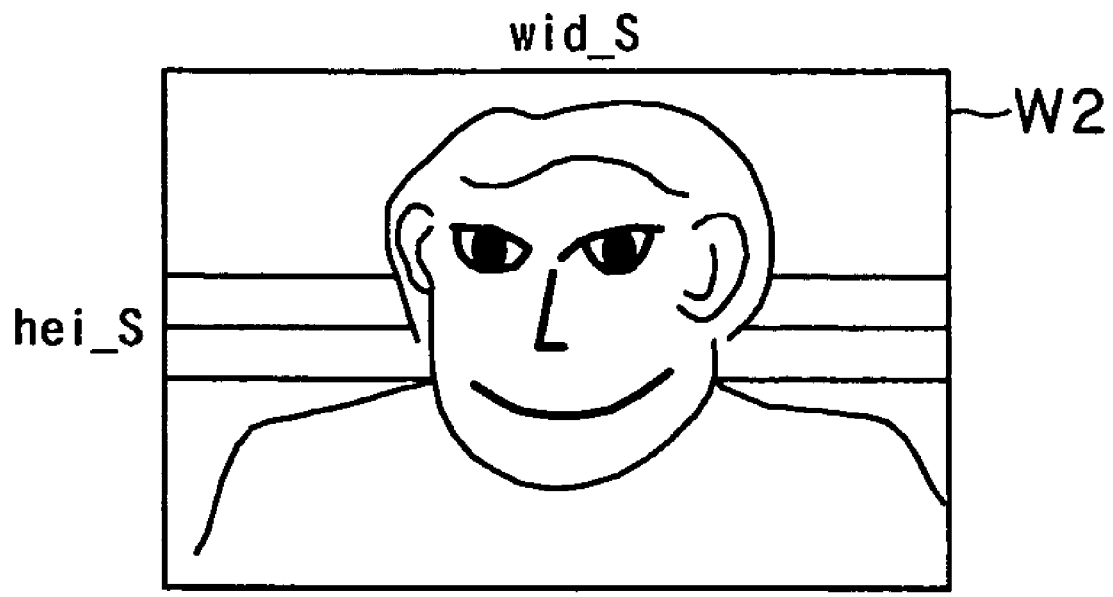
FIG. 12A is a schematic illustration of an input image (window image) and FIG. 12B is a schematic illustration of a template image.
Figure 12B:
Figure 13:
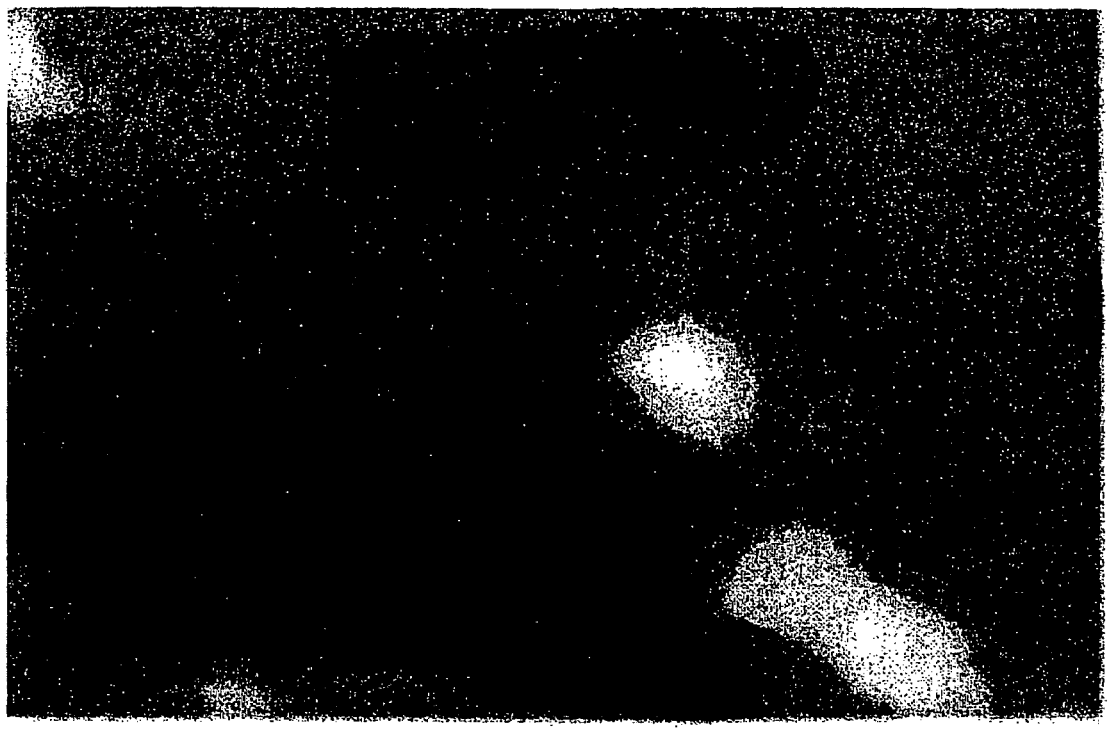
FIG. 13 is a matching result image that is a set of correlated values determined from the input image (window image) and the template.

More specifically, for a window image (input image after scale conversion) W2 having dimensions of height (the length of a side in the y-axis direction) hei_s×width (the length of a side in the x-axis direction) weid_s as shown in FIG. 12A, the template matching section 92 uses a template T2 having the first template size of height hei_t×width wid_s and showing the average face image as shown in FIG. 12B and determines the result of the matching operation that is a set of correlated values of the template T2 and the input image obtained by scanning the window image W2 and displacing each time by a predetermined number of pixels (e.g., a pixel). The result of matching is a two-dimensional arrangement of the correlated values obtained as a result of moving the template T2 so that a template matching result image R2 showing the correlated values and having dimensions of height hei_r and width wid_r as shown in FIG. 13 is obtained. Note that the height hei_r of the template matching result image R2 is equal to hei_s−(hei_t+1) and the width wid_s of the image R2 is equal to wid_s−(wid_t+1).

Then, the template matching result image R2 is divided into regions having a predetermined size, which may be same as the size of the first template, and the point (position) showing the maximum correlated value is determined in each of the regions obtained by dividing the image R2 and having the size of the first template. Then, of the maximum values obtained from the regions, those not smaller than a predetermined threshold value are extracted as face candidates.

Differently stated, when a normalized correlation is obtained by using a template that shows an average face, there is no guarantee that a face image shows higher correlated values than an arbitrarily selected pattern. However, if a face image having a size same as that of the template exists, correlated values give rise to the maximum value when the size is close to the template size so that the number of face candidates can be effectively reduced by extracting the points showing the maximum correlated values in the respective regions that are greater a threshold value as face candidates if compared with the case of extracting the points showing correlated values greater than a threshold value simply by template matching.

Then, the points extracted as face candidates are used as such (first face candidates) and points near the face candidates are also extracted as face candidates (second face candidates) and subjected to judgment of the downstream pattern discriminating section 95, using an SVM. An SVM is so sensitive that it can no longer detect a face if a single pixel is displaced by error. Therefore, in this embodiment, points near the face candidates are also used as objects of detection (second face candidates) to improve the performance of face detection by intensively detecting points located near the face candidates. If all the eight points that directly neighbor each of the points extracted as first face candidates are detected, the volume of computational operation at the downstream will be increased to a large extent. Therefore, those that satisfy certain conditions are selected from the directly neighboring points as object of detection to improve the performance of detection, while minimizing the increase in the volume of computational operation at the downstream.

More specifically, of the directly neighboring points of each of the points extracted as first face candidates, only those whose occupancy ratio of the skin color region (skin color occupancy ratio) is not smaller than a predetermined threshold value or those having a predetermined (pre-learnt) face color and whose occupancy ratio of the face color region (face color occupancy ratio) is not smaller than a predetermined threshold value are selected as object of detection. The skin color occupancy ratio can be determined by using a skin color table and comparing the skin color with the skin color table.

Subsequently, the template matching section 92 notifies the window cutting out section 91 of that the operation of template matching of the leading window image cut out from the first scale image is completed and has the window cutting out section 91 transmit the window image cut out from the first scale image that is to be scanned next to the template matching section 92.

In this way, the template matching section 92 sequentially scans all the window images cut out from the first scale image by the window cutting out section 91 and detects face candidates from them.

The scale conversion and cutting out section 93 reads out the plurality of score images stored in the DRAM 11 in the form of a candidate list for each scale image on a one by one basis and in the order of the candidate list, starting from the first scale image, and transmits them to the preprocessing section 94.

The preprocessing section 94 extracts 360 pixels, using a mask formed by cutting out parts of the four corners, in order to remove the four corner regions that correspond to the background and have nothing to do with a human face from the rectangular score image (400 pixels) obtained from the scale conversion and cutting out section 93.

Then, the preprocessing section 94 corrects the gradation value of each pixel so as to form a plane by referring to a site in the score image of the extracted 360 pixels that is optimum as face image for the purpose of dissolving the inclined condition of the object of shooting that is expressed by gradation due to the lighting at the time of image shooting.

Subsequently, the preprocessing section 94 performs a processing operation of histogram smoothing on the image obtained by stressing the contrast of the score image of the extracted 360 pixels so that the face candidates may be detected without being affected by the gain of the CCD camera 20 and the intensity of lighting.

Thereafter, the preprocessing section 94 subjects the score image of the extracted 360 pixels to vector conversion by means of a Gabor filter and converts the obtained vector group into a single pattern vector. It is already known that the visual cells of human being include those showing selectivity relative to a specific direction. More specifically, such cells include those that react to vertical lines and those that react to horizontal lines. A Gabor filter is a space filter formed by using a plurality of filters that show such a directional selectivity.

The pattern discriminating section 95, which operates as means of discrimination, acquires a preliminary discrimination function, using data for learning, or teacher data, that are externally supplied, and subsequently applies the discrimination function to the score image of the extracted 360 pixels obtained from the preprocessing section 94 as pattern vector in order to detect a face. When it succeeds in detecting a face, it outputs the obtained data as face data. When, on the other hand, it fails in detecting a face, it adds the obtained data to the learnt data as non-face data and repeats the learning process.

The pattern discriminating section 95 applies a support vector machine that is currently believed to have the highest learning/generalization ability in the field of pattern recognition to the score image of the extracted 360 pixels that is obtained from the preprocessing section 94 as pattern vector in order to detect a face, while learning the process of discrimination.

As for the support vector machine per se, it is described in detail in B. Sholkopf, C. Burges, A. Smola, "Advance in Kernel Support Vector Learning", The MIT Press, 1999). As a result of a preliminary experiment conducted by the applicant of the present patent application, it has been found that face recognition using a support vector machine provide better results if compared with techniques of Principal Component Analysis (PCA) and Neural Networks.

The support vector machine is a learning machine that uses a linear discrimination model (perceptron) as discrimination function and can extend its application to nonlinear spaces by using a Kernel function. For learning a discrimination function, the margin for inter-class separation is maximized and the solution can be obtained by quadratic mathematical programming so that it is theoretically guaranteed to attain a global solution.

Thus, the pattern discriminating section 95 prepares a list showing the position (coordinates) and the size (number of pixels) of the image region that correspond to the face data in the score image, the contraction ratio of the scale image from which the score image is cut out relative to the frame image (the corresponding step of the above five steps) and the template size for the pattern vector formed on the basis of the score image given from the preprocessing section 94 and stores the list in the DRAM 11 as list data.

Subsequently, the pattern discriminating section 95 notifies the scale conversion and cutting out section 93 of that the operation of detecting a face from the first score image cut out from the first scale image is completed. Then, the scale conversion and cutting out section 93 transmits the next score image cut out from the first scale image to the preprocessing section 94. The preprocessing section 95 converts the score image into a pattern vector and transmits it to the pattern discriminating section 95. The pattern discriminating section 95 prepares list data on the basis of the face data obtained from the pattern vector and stores them in the DRAM 11.

In this way, the scale conversion and cutting out section 93 has the preprocessing section 94 and the pattern discriminating section 95 perform respective processing operations for all the score images on the candidate list cut out from the first scale image so as to detect the face image that is found in the picked up image from the first scale image.

Differently stated, the template matching section 92 has the input image scale converting section 90 transmit the first scale image and a template of the second template size to the window cutting out section 91 by notifying it of that the operation of face detection using the first scale image and a template of the first template size is completed. The operation of face candidate detection as described above for the first template size is repeated for all the template sizes including the second template size and subsequently the template matching section 92 notifies the input image scale converting section 90 of that the operation of face detection on the first scale image, using all the template sizes, is completed and has the input image scale conversion determining section 90 transmit the second scale image to the window cutting out section 91.

The processing operation described above for the first scale image is repeated for the second scale image to detect face candidates that correspond to all the window images. Then, a similar processing operation is conducted sequentially for the third through fifth scale images.

Thus, the template matching section 92 extracts face candidates that correspond to the plurality of cut out window images of the first through fifth scale images that are obtained by contracting the frame image, or the picked up image, to five respective sizes and the templates of the plurality of template sizes and stores the obtained face candidates in the DRAM 11 along with the window images.

While this embodiment is adapted to use templates of any sizes, the volume of computational operation is nevertheless reduced by selecting a template size and switching to the selected template size for use if compared with the case where a computational operation needs to be repeated for all the template sizes that can be provided for the input image. For example, when a face is detected, the same template size can be used for the next face detecting operation. It is also possible to provide a distance-to-object switching means to be used for selecting a template size by predicting the size of the face region of an object, using the distance sensor that the robot is equipped with and recognizing the distance between the robot and the object contained in the input image on the basis of the distance information from the distance sensor.

(3-2) Operation of the Face Detecting Section

In the robot 1 having the above described configuration, the frame image picked up by the CCD camera 20 is converted into a plurality of scale images of different contraction ratios and subsequently window images of a predetermined size are cut out from each of the scale images on a one by one basis by scanning the scale image and displacing by a predetermined number of pixels.

Then a matching result image is generated for the window images as a set of correlated values determined from the window image and a template of a predetermined size, indicating an average face image, by way of a matching operation. Then, in this way, a matching result image is generated for all the window images of each scale image according to the scanning sequence. Now, the process of detecting face candidates from the matching result images will be described below in detail.

Figure 14:
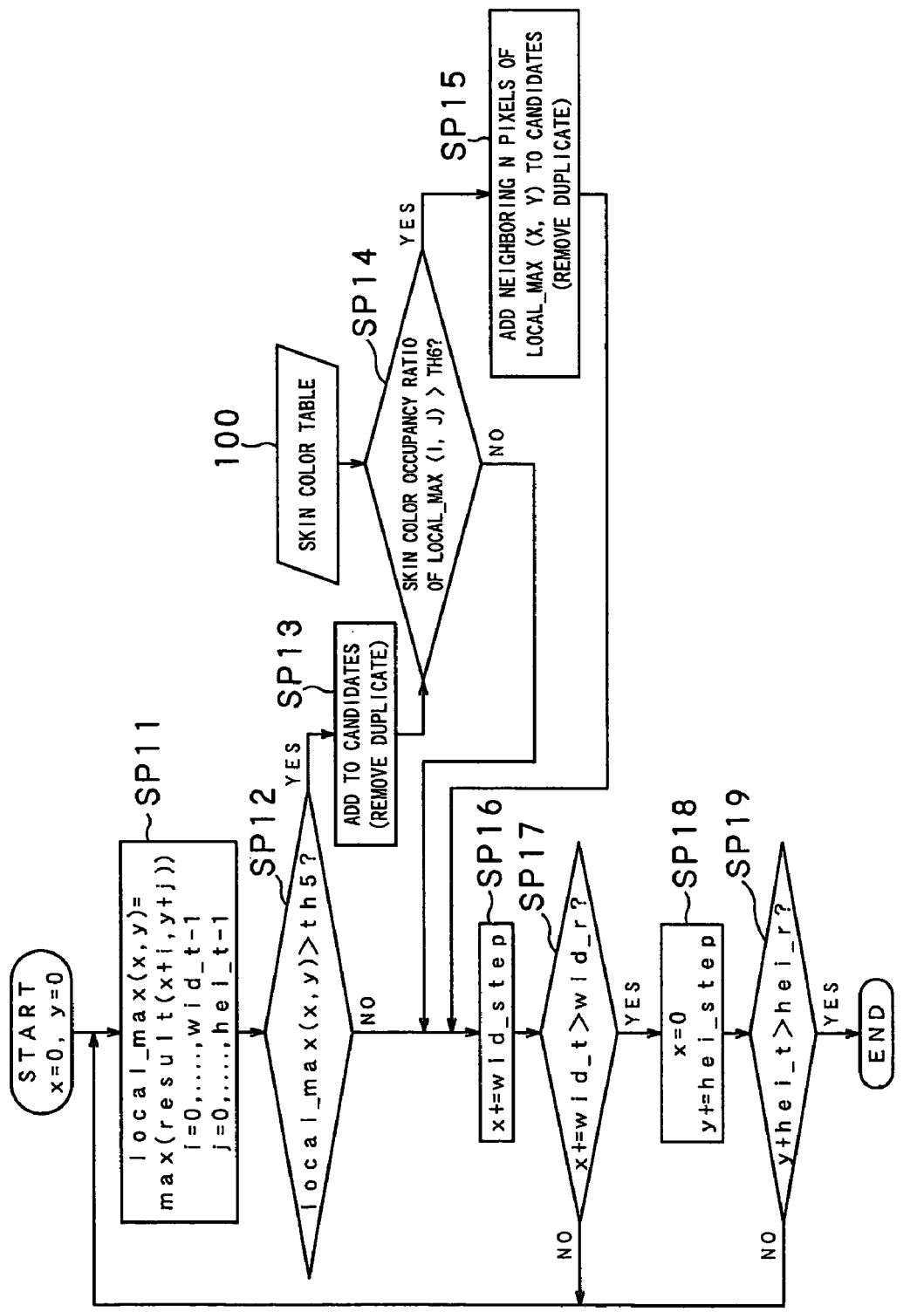
FIG. 14 is a flow chart of the processing operation of the template matching section 12 of a face detector, which is an embodiment of the present invention.

FIG. 14 is a flow chart of the processing operation of the template matching section 92 for detecting pixels that can be face candidates from a template matching result image R2. Referring to FIG. 14, firstly, as a template matching result image R2 is input, the matching result image R2 is divided into regions of the template size and the point (coordinates) showing the maximum correlated value is detected in one of the divided regions, for example $0 \leq x \leq wid\_t-1$, $0 \leq y \leq hei\_t-1$ (Step SP11). The region obtained by dividing the matching result image R2 is referred to as divided region rn and the point (coordinates) showing the maximum correlated value in the divided region rn is referred to as local_max (x, y) hereinafter. In the following description, the pixel showing the maximum correlated value is extracted from each divided region and the divided regions obtained by dividing a matching result image are processed sequentially from left to right on a row by row basis.

Then, it is determined if local_max (x, y) is greater than a predetermined threshold value (th5) or not (Step SP12) and, if it is greater than the predetermined threshold value, it is added as face candidate (Step SP13). As pointed out above, the input image scale conversion determining section 90 selects a scale and a template size that matches the size of the face expected to be contained in the input image. However, there are a number of different template sizes and the same point can be extracted twice or more than twice when a matching result image R2 is computationally determined for each template size of the plurality of sizes. Therefore, if the same point is extracted twice or more than twice in Step SP13 and hence if a face candidate that is extracted has been extracted with a different template size, it is not added as candidate.

Then, the occupancy ratio of the skin color pixels contained in the input image region of the template size that corresponds to the point extracted as face candidate is determined. In this embodiment, the skin color table 100 is referred to when determining the occupancy ratio of the skin color pixels. Then, it is determined if the skin color pixel occupancy ratio is greater than a predetermined threshold value (th6) or not (Step SP14). If the skin color pixel occupancy ratio is greater than the predetermined threshold value, the points directly neighboring the local_max (x, y), for example eight directly neighboring points, are added as face candidates (Step SP15). As in Step SP13, if the eight neighboring points have already been extracted as face candidates, they are not added as candidates.

If, on the other hand, when local_max (x, y) is determined to be smaller than the threshold value th5 in Step SP12, when the skin color pixel occupancy ratio of the input image that corresponds to local_max (x, y) is determined to be smaller than the threshold value th6 in Step SP14 and when the addition of one or more than one face candidates in Step SP15 is over, the processing operation proceeds to Step SP16 to move to the next divided region in order to extract face candidates and proceeds with the processing operation.

Firstly, the next divided region that is displaced in the x-direction from the preceding divided region by the template size, or wid_t, in the matching result image R2 is selected (Step S16). If the x-coordinate of the divided region that is displaced by wid_t (x+wid_t) is greater than the width of the matching result image (the length of a side along the x-direction) wid_r, it means that the divided region is not contained in the matching result image. Then, the processing operation proceeds to the next row and to the next divided region where $0 \leq x \leq$ wid_t−1 and that is displaced in the y-direction by the size of the template, or hei_t from the preceding divided region (Step SP18). Then, it is determined if the y-coordinate of the divided region is greater than the height of the matching result image (the length of a side along the y-direction) hei_r or not (Step SP16). If it is determined that the y-coordinate is greater than the height of the matching result image, it means that the maximum correlated value is obtained in all the divided regions of the matching result image so that the processing operation is terminated.

If, on the other hand, it is determined in Steps S17 and S18 that the divided region is contained in the matching result image, the processing operation returns to Step SP11, where the point showing the maximum correlated value is extracted from the divided region.

Since the maximum correlated value is determined in each of the divided regions of the template size obtained by dividing the matching result image R2 in this embodiment, the next divided region is regarded to be displaced in the x-direction by wid_t from the immediately preceding divided region in the operation of Step SP16, the matching result image R2 can be divided into regions of arbitrarily selected dimensions so long as the regions are smaller than the template size. Then, if the image to be divided has a width (length of a side along the x-direction) wid_step and a height (length of a side along the y-direction) hei_step, the processing operation proceeds to the next divided region by moving in the x-direction and the y-direction respectively by wid_step and hei_step in Steps SP16 and SP18.

Thus, as described above, after removing parts of the four corners of the rectangular region of the a window image (or score image) that is judged to contain a face image, the template matching section 92 corrects the gradation and subsequently smoothes the image by stressing the contrast. Subsequently, it converts the image into a single pattern vector.

Then, for the pattern vector, a face is detected in the original score image and the obtained data are determined to be face data or non-face data. Then, list data are generated by listing the position (coordinates) of the image region of each score image where face data are found, the size of the image region (number of pixels) and the contraction ratio of the score image relative to the original frame image of the scale image from which the score image is cut out.

After generating the list data, for all the score images contained in each scale image, the score images contained in each set of list data are compared with each other to obtain face determining data, from which overlapping regions are removed, in order to detect a face image from the original frame image.

(3-3) Advantages of the Specific Example

If compared with the case where all the points showing a value not smaller than a threshold value are extracted as face candidates from the face candidates of the matching result image R2 shown in FIG. 13, the template matching section 92 reduces the number of points extracted as face candidates so as to dramatically reduce the volume of computational operation in the downstream process.

In this specific example, when roughly judging if a window image contains a face image by using a template showing an average face image for matching, the template matching result image is divided into regions of a predetermined size and the point showing the maximum correlated value in each region is extracted as face candidate. Then, window images that obviously do not contain any face image are removed from the face candidates. With this arrangement, it is possible to reduce the volume of computational operation and the time necessary for the downstream face detecting process without missing proper face regions. Thus, it is possible to provide a face detector that can show excellent real time performances and a robot equipped with such a face detector.

Additionally, the accuracy of face detection can be improved when not only the point showing the maximum correlated value but also neighboring points are detected in each score image. Still additionally, the number of face candidates can be reduced to reduce the volume of computational operation at the downstream without lowering the face detection accuracy by selecting a face detection region only when it shows a skin color occupancy ratio or a face color occupancy ratio greater than a predetermined threshold value. Moreover, the volume of computational operation can be further reduced by switching a template size.

As described above in detail, the face detecting section 110 judges a region as face when it satisfies predetermined conditions as a result of, for instance, selecting a region showing a skin color occupancy ratio higher than a predetermined threshold value. This embodiment comprises a non-face judging section adapted to extract and eliminate non-faces as additional feature for face detection tasks. With this arrangement, detection errors in face detection can be reduced without increasing the volume of computational operation.

The robot 1 can be made to detect an obstacle, a land mark for identifying its own position and a moving body as object of tracking from the input image in addition to a face. In short, it can be made to detect various objects that meet predetermined conditions from the input image. With such an arrangement, detection errors can be reduced by providing it with a non-object detecting means, or detection error preventing means, that eliminate objects that satisfy predetermined conditions from objects of detection as in the case of the non-face judging section of this embodiment.

What is claimed is:

1. An object detector for detecting an object of detection out of an input image, the detector comprising:
   an object detecting unit adapted to detect object candidates judged to be the object;
   a non-object detecting unit adapted to detect non-object candidates judged to be non-objects and output the object candidates less the non-object candidates;
   a distance measuring unit adapted to measure a distance between the object detector and the object of detection;
   the non-object detecting unit is further adapted to compute an assumed distance between the object detector and the object of detection on the basis of a size of an object candidate in the detected object candidates relative to the input image and judge the object candidate to be a non-object candidate when a difference between the assumed distance and the distance measured by the distance measuring unit is greater than a predetermined threshold value; and
   the non-object detecting unit is further adapted to compute, using a processor, a variance of the object candidate in a color space and, if the variance is less than a predetermined variance threshold value, judge the object candidate to be the non-object candidate.

2. The object detector according to claim 1, wherein:
   the object of detection includes a face region;
   the object detecting unit is adapted to detect face candidates judged to be the face region satisfying certain face conditions; and
   the non-object detecting unit includes a non-face detecting unit adapted to detect non-face candidates judged to be non-faces satisfying certain non-face conditions and output the face candidates less the non-face candidates.

3. The object detector according to claim 2, wherein the non-face detecting unit is adapted to judge the face candidate as a non-face candidate when a difference between a size of the face candidate in the input image and a size of the face candidate in an input image of a predetermined time ago is greater than a predetermined threshold value.

4. The object detector according to claim 2, wherein the non-face detecting unit is adapted to compute an occupancy ratio of a skin color region relative to the face region and judge the face candidate to be a non-face candidate when the occupancy ratio of the skin color region is higher than a predetermined threshold value.

5. The object detector according to claim 2, further comprising:
   a tracking unit adapted to track the face candidates from which the non-face candidates are removed by the non-face detecting unit; and
   the non-face detecting unit is further adapted to detect the non-face candidates from the face candidates that are tracked by the tracking unit at a predetermined timing.

6. The object detector according to claim 2, wherein the face detecting unit includes a matching result generating unit adapted to determine a correlated value of the input image and a template of a predetermined size showing an average face image and a discriminating unit configured to discriminate the face candidate by pattern recognition from the input image region selected on the basis of the correlated value.

7. An object detecting method for an object detector to detect an object of detection out of an input image, the method comprising:
   detecting object candidates judged to be the object;
   detecting non-object candidates judged to be non-objects and outputting the object candidates less the non-object candidates;
   measuring a distance between the object detector and the object of detection;
   computing an assumed distance between the object detector and the object of detection on the basis of a size of an object candidate relative to the input image;
   judging the object candidate to be a non-object candidate when a difference between the assumed distance and the distance measured by the measuring is greater than a predetermined threshold value;
   computing, using a processor, a variance of the object of detection in a color space; and
   judging the object candidate to be the non-object candidate if the variance is less than a predetermined variance threshold value.

8. The method according to claim 7, wherein:
   the object of detection includes a face region;
   the detecting object candidates includes detecting face candidates judged to be the face region satisfying certain face conditions; and
   the detecting non-object candidates includes non-face candidates judged to be non-faces satisfying certain non-face conditions and outputting the face candidates less the non-face candidates.

9. The method according to claim 8, wherein the detecting non-face candidates includes judging the face candidate as a non-face candidate when a difference between a size of the face candidate in the input image and the size of the face candidate in an input image of a predetermined time ago is greater than a predetermined threshold value.

10. The method according to claim 8, wherein the detecting non-face candidates includes computing an occupancy ratio of a skin color region relative to the face region and judging the face candidate to be a non-face candidate when an occupancy ratio of the skin color region is higher than a predetermined threshold value.

11. The method according to claim 8, further comprising:
    tracking the face candidates from which the non-face candidates are removed by detecting non-face candidates; and
    detecting the non-face candidates from the face candidates that are tracked by the tracking at a predetermined timing.

12. A robot equipped with an object detector for detecting an object of detection out of an input image and configured to autonomously act based on the object of detection, the object detector comprising:
    an object detecting unit adapted to detect object candidates judged to be the object;
    a non-object detecting unit adapted to detect non-object candidates judged to be non-objects and output the object candidates less the non-object candidates;
    a distance measuring unit adapted to measure a distance between the object detector and the object of detection;
    the non-object detecting unit is further adapted to compute an assumed distance between the object detector and the object of detection on the basis of a size of an object candidate in the detected object candidates relative to the input image and judge the object candidate to be a non-object candidate when a difference between the assumed distance and the distance measured by the distance measuring unit is greater than a predetermined threshold value and;

the non-object detecting unit is further adapted to compute, using a processor, a variance of the object candidate in a color space and, if the variance is less than a predetermined variance threshold value, judge the object candidate to be the non-object candidate.

13. The robot according to claim 12, wherein:

the object detector unit is adapted to detect a face region from the input image as the object of detection;

the object detecting unit is adapted to detect face candidates judged to be the face region satisfying certain face conditions; and the non-object detecting unit includes a non-face detecting unit adapted to detect non-face candidates judged to be non-faces satisfying certain non-face conditions and output the face candidates less the non-face candidates.

14. The robot according to claim 13, wherein the non-face detecting unit is adapted to judge the face candidate as a non-face candidate when a difference between a size of the face candidate in the input image and a size of the face candidate in an input image of a predetermined time ago is greater than a predetermined threshold value.

15. The robot according to claim 13, wherein the non-face detecting unit is adapted to compute an occupancy ratio of a skin color region relative to the face region and judge the face candidate to be a non-face candidate when the occupancy ratio of the skin color region is higher than a predetermined threshold value.

* * * * *